United States Patent
Sawada et al.

[11] Patent Number: 6,040,890
[45] Date of Patent: Mar. 21, 2000

[54] ELECTRIC OPTICAL LIQUID CRYSTAL SYSTEM

[75] Inventors: Shinichi Sawada; Shizuo Murata; Toyoshiro Isoyama, all of Chiba, Japan

[73] Assignee: Chisso Corporation, Osaka, Japan

[21] Appl. No.: 09/101,021
[22] PCT Filed: Dec. 4, 1996
[86] PCT No.: PCT/JP96/03559
§ 371 Date: Jun. 29, 1998
§ 102(e) Date: Jun. 29, 1998
[87] PCT Pub. No.: WO97/24640
PCT Pub. Date: Jul. 10, 1997

[30] Foreign Application Priority Data

Dec. 27, 1995 [JP] Japan ................................. 7-353704

[51] Int. Cl.[7] .................................................. C09K 19/52
[52] U.S. Cl. ..................... 349/182; 349/123; 252/299.01
[58] Field of Search ....................... 252/299.01; 349/123, 349/182

[56] References Cited

U.S. PATENT DOCUMENTS

| | | | |
|---|---|---|---|
| 5,356,557 | 10/1994 | Jubb et al. | 252/299.01 |
| 5,384,065 | 1/1995 | Geelhaar et al. | 252/299.63 |
| 5,578,241 | 11/1996 | Plach et al. | 252/299.01 |
| 5,698,134 | 12/1997 | Jubb et al. | 252/299.01 |
| 5,807,498 | 9/1998 | Gibbons et al. | 252/299.4 |
| 5,858,273 | 1/1999 | Asaoka et al. | 252/299.4 |
| 5,858,274 | 1/1999 | Mishina et al. | 252/299.4 |
| 5,863,458 | 1/1999 | Miyata et al. | 252/299.01 |

*Primary Examiner*—C. H. Kelly
*Attorney, Agent, or Firm*—Wenderoth, Lind & Ponack, L.L.P.

[57] ABSTRACT

An electric optical system, wherein outsides of transparent upper and lower substrates in a bend cell are placed cross-nicolly between (one or more than one) birefringent film(s) and (two or more than two) polarized plates, and wherein the said substrates facing each other have such a relationship that a pre-tilt direction of liquid crystal molecules in one substrate interface and a pre-tilt direction of liquid crystal molecules in the other substrate interface of the substrates being planar symmetrical positions against center planes of both substrates, optionally with an active switch element formed on either transparent substrate in matrix form, as well as wherein there is used an oriented memberane made of a liquid crystal compound etc. expressed by the formula 1 and/or the formula 5 as the above-mentioned liquid crystal molecules.

17 Claims, 1 Drawing Sheet

ELECTRIC OPTICAL LIQUID CRYSTAL SYSTEM

This application is a 371 application of International Application No. PCT/JP96/03559 filed Dec. 4, 1996.

TECHNICAL FIELD

The present invention relates to an electric optical liquid crystal system. In more detail, it relates to a novel electric optical system having a good high-speed response, a wide visual range and a high contrast, characterized in that outsides of transparent upper and lower substrates in a bend cell are placed cross-nicolly between at least one birefringent film and at least two polarized plates, wherein the said substrates facing each other have such a relationship that a pre-tilt direction of liquid crystal molecules in one substrate interface and a pre-tilt direction of liquid crystal molecules in the other substrate interface of the substrates are planar symmetrical positions against center planes of both substrates, optionally with an active switch element formed on either transparent substrate in matrix form.

BACKGROUND ART

A liquid crystal panel (hereinafter referred to π cell) having liquid crystals filled between one pair of facing substrates wherein crystals orient in such a quasi-parallel way that a pre-tilt direction of both substrate molecules are planar symmetrical against the center plane between substrates has certain characteristics, namely a short ON-OFF time (hereinafter referred to a response time) and an eminently low visual dependency (Philip J. Bos et al, SID 83 DIGEST P. 30–31, 1983).

Furthermore, a flat liquid crystal image display panel can be obtained by switching selectively an active switching element formed on either transparent substrate in π cell in matrix form (Toku-Kai-Sho 61-116329).

Also, in π cell, an OFF state (a bend orientation) is quasi-stable and may shift to a more stable quasi-homogeneous state (a splay orientation) within a relaxation time of several seconds to several dozen seconds. In order to carry out switching an ON state (a vertical orientation) and an OFF state stably, it is necessary to put a certain bias voltage before a bend orientation of an OFF state shifts to a splay orientation. Concretely, it may be a periodical ON voltage or an irregular pulse which does not obstruct displaying (Toku-Kai-Sho 61-128227).

Furthermore, those with a more improved visual dependency obtained by placing π cells and a birefringent film between crossnicols are known as OCB cells (Y. Yamaguchi et al., SID 93 DIGEST P. 227, 1993).

In OCB cells, there are used cells with twist angles between upper and lower substrates of 0° (the above-mentionedπ cells), biaxial phase different plates and nematic liquid crystal compositions without addition of any chiral agent, which are very different from cells of conventional TN (twist nematic) and STN (supertwist nematic) modes. A characteristic of the OCB cells on driving is to drive liquid crystal molecules in cells in a bend oriented state. That is, it is realized to obtain a very wide visual angle and a very high contrast compared to cells of conventional TN (twist nematic) and STN (supertwist nematic) modes by combining bend oriented liquid crystals with biaxial phase different plates. Furthermore, it is also realized to obtain a very fast response time such as 1/20 to 1/500 compared to cells of conventional TN (twist nematic) and STN (supertwist nematic) modes by driving liquid crystals in a bend oriented state.

However, any combination of OCB cell and an active switching element is not known from the above-mentioned prior arts.

Particularly in the case of using OCB cells combined with active switching elements, it is not known that characteristic combinations of materials, for example, liquid crystal materials, oriented membranes etc., influence display qualities of the cells.

For example, liquid crystals used in the above-mentioned prior arts are ZLI-1132 made by Merck Co. consisting of cyanophenylcyclohexane derivatives and E-44 made by BDH Co. consisting of cyanobiphenyl derivatives, etc. Furthermore, there is no description about an oriented membrane.

In the case that a flat liquid crystal image display panel is prepared by switching selectively an active switching element in π cells, particularly formed on either transparent substrate of π cells in matrix form, it is known that deterioration of image signal results in deterioration of image display characteristics, especially the contrast.

Deterioration of image signals depends on direct current residual electric charges or voltage holding ratios of constituting materials, especially liquid crystal materials and oriented membrane materials, arranged within insides of cells. For example, the above-mentioned ZLI-1132 or E-44 uses compounds having CN groups as terminal groups much, so that not only direct current residual electric charges become more, but also voltage holding ratios become very less.

As a result, these liquid crystal materials cause a decrease in the contrast of display in an active matrix driving method, which can not be put to practical use.

However, combinations of various parameters attained are still unsuitable and insufficient especially as to an electric optical system according to the present invention having a high contrast. It attributes to the fact that various requirements are influenced oppositely due to physical properties.

Thus, in order to have a high contrast and simultaneously possess a wide active temperature range, a good high-speed response, a wide visual range, a low temperature dependency of a threshold voltage value and a low frequency dependency adapted to the above-mentioned requirements, there are many problems to be solved.

PROBLEMS TO BE SOLVED BY THE INVENTION

An object of the invention is to solve these problems in order that any above-mentioned disadvantage is completely or substantially avoided, and propose a novel electric optical system with a good high-speed response, a wide visual range and a high contrast.

DISCLOSURE OF THE INVENTION

The present invention has the following features.

(1) In an electric optical system, characterized in that outsides of transparent upper and lower substrates in a bend cell are placed crossnicolly between at least one birefringent film and at least two polarized plates, wherein the said substrates facing each other have such a relationship that the pre-tilt direction of liquid crystal molecules-layer in one substrate interface and a pre-tilt direction of liquid crystal molecules layer in the other substrate interface of the substrates being symmetrical with respect to a plane parallel to the substrates, as well as in that there is used an oriented membrane made of at least one compound selected from a group consisting of liquid crystal compounds and liquid crystalline compounds expressed by the formula 1, and/or a liquid crystal mixture comprising at least one compound selected from a group consisting of liquid crystal and liquid crystalline compounds expressed by the formulae 2, 3, 4A and 4B, and furthermore an oriented membrane shown in FIGS. 1–2 made of compounds expressed by the formula 5:

Formula 1

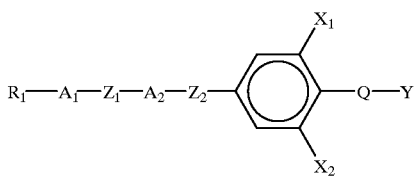

(1)

(wherein, $R_1$ denotes an alkyl or alkoxy with 1 to 8 carbon atoms, furthermore, an alkoxymethyl or alkoxyethyl group, or an alkenyl group with up to 7 carbon atoms, $Z_1$ and $Z_2$ denote independently from each other —$CH_2CH_2$—, —COO—, or a single bond, Q is —$CF_2$—, —$OCF_2$—, —$OCF_2CFHCF_2$— or a single bond, Y denotes H, F, Cl or an alkyl group optionally substituted with F atom(s), $X_1$ and $X_2$ are H, Cl or F, $A_1$ and $A_2$ are independently from each other trans-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene, pyrimidine-2,5-diyl or pyridine-2,5-diyl.), Formula 2

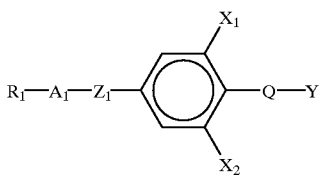

(2)

wherein, $R_1$ is preferably an alkyl, alkoxy or alkoxyalkyl with 1 to 8 carbon atoms, or an alkenyl with up to 7 carbon atoms, $Z_1$ denotes —$CH_2CH_2$—, —COO—, or a single bond, Q is —$CF_2$—, —$OCF_2$— or a single bond, Y denotes H, F, Cl or an alkyl group optionally substituted with F atom(s), $X_1$ and $X_2$ are H, Cl or F, $A_1$ is trans-1,4-cyclohexylene, 1,4-phenylene, 2-fluoro-1,4-phenylene, 3-fluoro-1,4-phenylene, 2,3-difluoro-1,4-phenylene, 3,5-diIfluoro-1,4-phenylene, pyrimidine-2,5-diyl or pyridine-2,5-diyl.), Formula 3

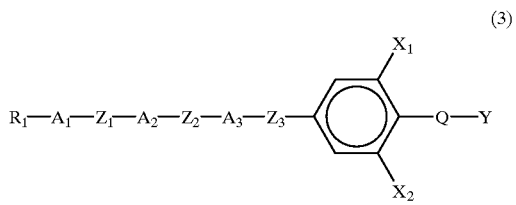

(3)

(wherein, $R_1$ is preferably an alkyl group with 1 to 8 carbon atoms, $Z_1$, $Z_2$ and $Z_3$ denote independently from each other —$CH_2CH_2$—, —COO—, or a single bond, Q is —$CF_2$—, —$OCF_2$— or a single bond, Y denotes H, F, Cl or an alkyl group optionally substituted with F atom(s), $X_1$ and $X_2$ are H, Cl or F, $A_1$, $A_2$ and $A_3$ are independently each other trans-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene, pyrimidine-2,5-diyl or pyridine-2,5-diyl.), Formulae 4A, 4B

(4A)

(4B)

(in the formulae 4A and 4B, substituents L and E denote independently from each other -Phe-, -Cyc-, -Phe-Phe-, -Phe-Cyc-, -Cyc-Cyc-, -Pyr-, -G-Phe-, -G-Cyc- and enantiomers, wherein -Phe- denotes 1,4-phenylene optionally substituted with F atom(s), -Cyc- denotes trans-1,4-cyclohexylene or trans-1,4-cyclohexenylene, -Pyr- denotes pyrimidine-2,5-diyl or pyridine-2,5-diyl, -G- denotes 2-(trans-1,4-cyclohexyl)ethyl, pyrimnidine-2,5-diyl or pyridine-2,5-diyl, and one of substituents L and E is -Phe-, -Cyc-, -Pyr- or -Phe-Cyc-, and in the formulae 4A and 4B, $R_1$ and $R_2$ are independently from each other an alkyl, alkenyl, alkoxy, alkenyloxy or alkanoyloxy with up to 8 carbon atoms.), formula 5, formulae X1 to X8, formulae Y1 to Y8

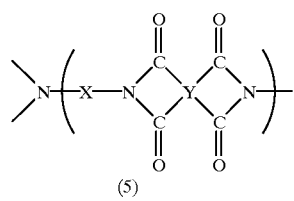

(5)

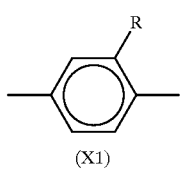

(X1)

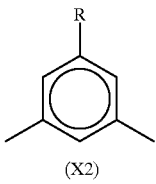

(X2)

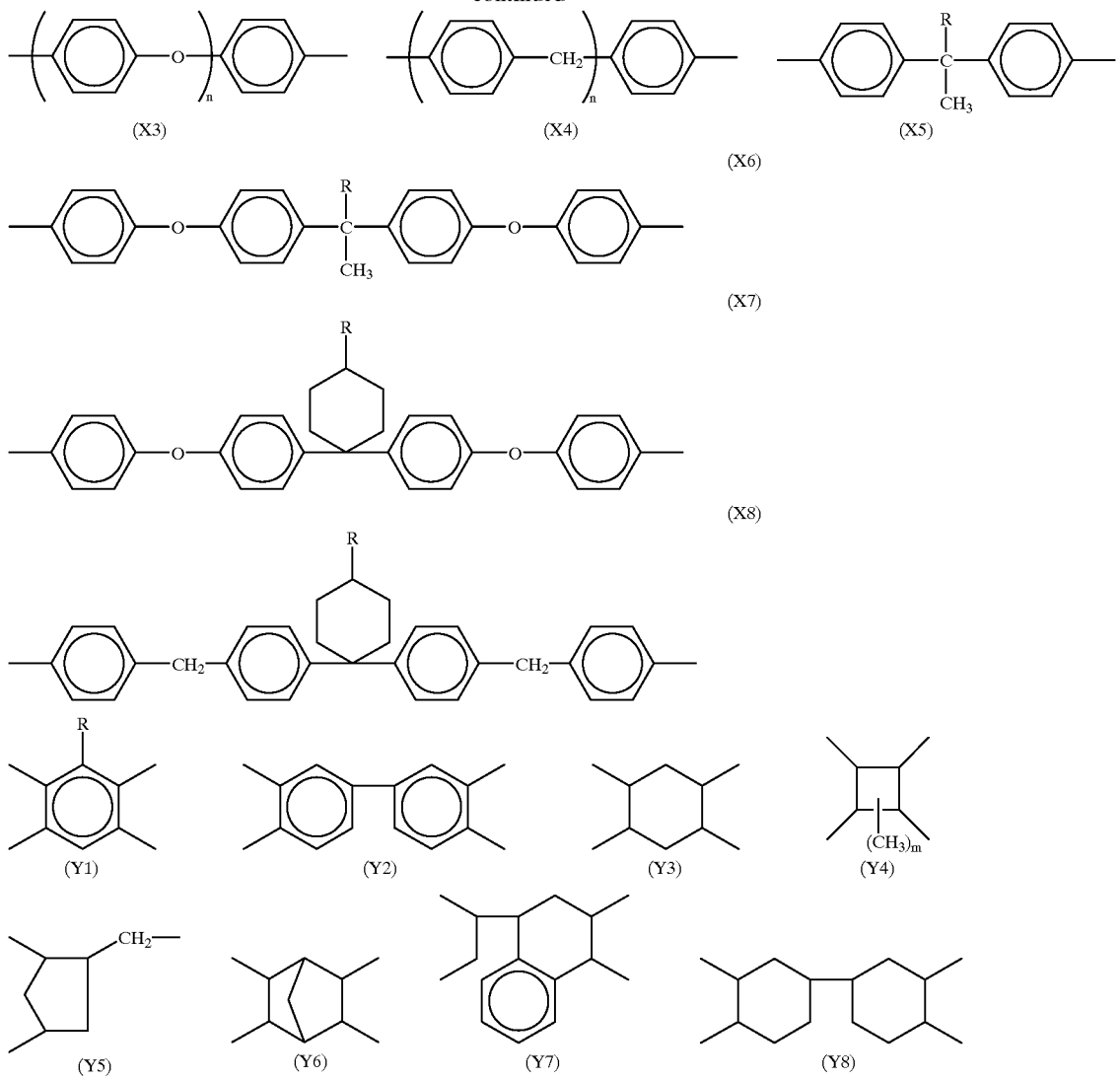

(in the formula 5, X represents a bivalent aromatic group such as formulae X1–X8, Y represents a tetravelent aromatic ring or an aliphatic ring with 4, 5 or 6-ring structure such as formulae Y1–Y8, and
in the formulae X1 to X8, R represents H or an alkyl group with 1 to 10 carbon atoms, n represents a real number of 1 to 3, and in the formulae Y1 to Y8, R represents H or an alkyl group with 1 to 10 carbon atoms, m represents a real number of 1 to 4.)

(2) An electric optical system according to the above-mentioned item (1), wherein an active switch element is formed in matrix form on either of the facing transparent substrates.

(3) An electric optical system according to the above-mentioned items (1) and (2), wherein a pre-tilt angle ranges at least within 0 to 20°, and the product of a refractive anisotropy and a thickness of the layer ranges within $0.3 \leq \Delta n \cdot d \leq 1.2$.

(4) An electric optical system according to the above-mentioned items (1) to (3), characterized in that a liquid crystal mixture is included wherein the mixture contains more than 60%, preferably more than 80% and more preferably 100% of at least one compound selected from a group consisting of liquid crystal and liquid crystalline compounds of the formula 1 and/or formulae 2 to 4B, wherein a refractive anisotropy thereof is $0.05 \leq \Delta n \leq 0.25$, an elastic modulus ratio is $K_{33}/K_{11} \leq 1.5$, and a dielectric anisotropy is $\Delta \epsilon \geq 1$, more preferably $\Delta \epsilon \geq 3$, as well as it has a positive dielectric value:

Formula 1, Formula 2, Formula 3, Formula 4A, Formula 4B

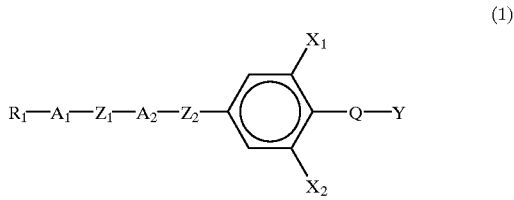

(1)

-continued

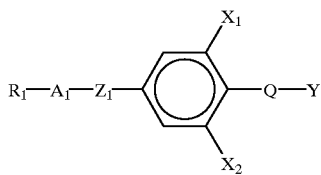
(2)

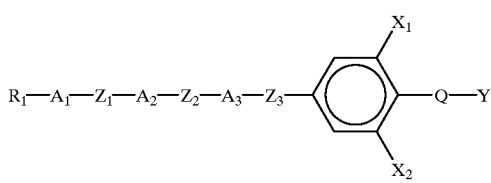
(3)

$R_1$-L-E-$R_2$ (4A)

$R_1$-L-CH$_2$CH$_2$-E-$R_2$ (4B)

(5) An electric optical system according to the above-mentioned items (1) to (4), wherein the formulae 1 to 3 are as follows:

Formula 1

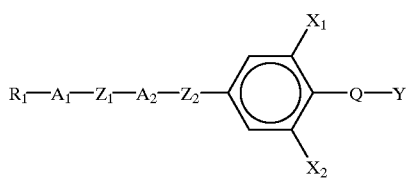
(1)

(wherein, $R_1$ is an alkyl group with 1 to 8 carbon atoms or an alkenyl group with up to 7 carbon atoms, $Z_1$ and $Z_2$ denote independently each other —CH$_2$CH$_2$— or a single bond, Q is —CF$_2$—, —OCF$_2$—, —OCF$_2$CFHCF$_2$— or a single bond, Y denotes H, F, Cl or an allcyl group optionally substituted with F atom(s), $X_1$ and $X_2$ are H, Cl or F, $A_1$ and $A_2$ are independently from each other trans-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene, pyrimidine-2,5-diyl or pyridine-2,5-diyl.), Formula 2

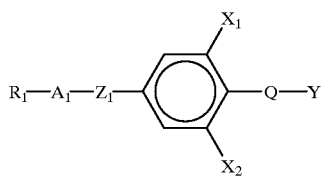
(2)

(in the formula 2, R1 is preferably an alkyl with 1 to 8 carbon atoms, or an alkenyl with up to 7 carbon atoms, $Z_1$ denotes —CH$_2$CH$_2$— or a single bond, Q is —CF$_2$—, —OCF$_2$— or a single bond, Y denotes H, F, Cl or an alkyl group optionally substituted with F atom(s), $X_1$ and $X_2$ are H, Cl or F, $A_1$ is trans-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene, pyrimidine-2,5-diyl or pyridine-2,5-diyl.), Formula 3

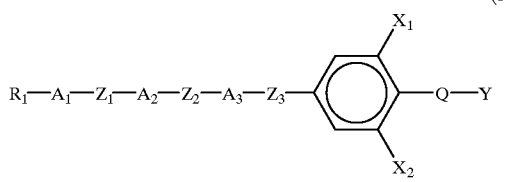
(3)

(wherein, $R_1$ is preferably an alkyl group with 1 to 8 carbon atoms, $Z_1$, $Z_2$ and $Z_3$ denote independently from each other —CH2CH2— or a single bond, Q is —CF$_2$—, —OCF$_2$— or a single bond, Y denotes H, F, Cl or an alkyl group optionally substituted with F atom(s) at H atom(s), $X_1$ and $X_2$ are H, Cl or F, $A_1$, $A_2$ and $A_3$ are independently each other trans-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene, pyrimidine-2,5-diyl or pyridine-2,5-diyl.), (6) An electric optical system according to the above-mentioned items (1) to (5), wherein at least one of the compounds selected from the formula 1 is expressed as follows:

Formula 1

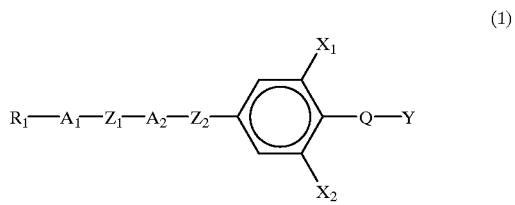
(1)

(wherein, $R_1$ is an alkyl group with 1 to 8 carbon atoms, $Z_1$ and $Z_2$ denote independently from each other —CH$_2$CH$_2$— or a single bond, Q is —CF$_2$—, —OCF$_2$—, —OCF$_2$CFHCF$_2$— or a single bond, Y denotes H, F, Cl or an alkyl group optionally substituted with F atom(s), $X_1$ and $X_2$ are H, Cl or F, $A_1$ and $A_2$ are independently from each other trans-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene, pyrimidine-2,5-diyl or pyridine-2,5-diyl, with the proviso that either of $A_1$ and $A_2$ is pyrimidine-2,5-diyl or pyridine-2,5-diyl.).

(7) An electric optical system according to the above-mentioned items (1) to (6), wherein at least one of the compounds selected from the formula 2 is expressed as follows:

Formula 2

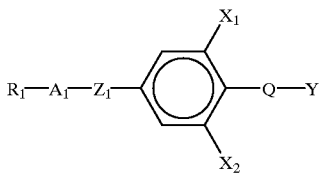
(2)

(wherein, $R_1$ is preferably an alkyl with 1 to 8 carbon atoms, or an alkenyl with up to 7 carbon atoms, $Z_1$ denotes —$CH_2CH_2$— or a single bond, Q is —$CF_2$—, —$OCF_2$— or a single bond, Y denotes H, F, Cl or an alkyl group optionally substituted with F atom(s), X1 and $X_2$ are H, Cl or F, $A_1$ is pyrimidine-2,5-diyl or pyridine-2,5-diyl.).

(8) An electric optical system according to the above-mentioned items (1) to (7), wherein at least one of the compounds selected from the formula 3 is expressed as follows:

Formula 3

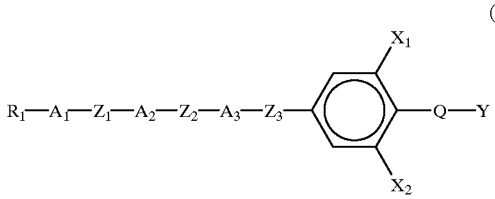
(3)

(wherein, $R_1$ is preferably an alkyl group with 1 to 8 carbon atoms, $Z_1$, $Z_2$ and $Z_3$ denote independently from each other —$CH_2CH_2$— or a single bond, Q is —$CF_2$—, —$OCF_2$— or a single bond, Y denotes H, F, Cl or an alkyl group optionally substituted with F atom(s), $X_1$ and $X_2$ are H, Cl or F, $A_1$, $A_2$ and $A_3$ are independently from each other trans-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene, pyrimidine-2,5-diyl or pyridine-2,5-diyl, with the proviso that either one of $A_1$, $A_2$ and $A_3$ is pyrimidine-2,5-diyl or pyridine-2,5-diyl.).

(9) An electric optical system according to the above-mentioned items (1) to (8), wherein at least one of the compounds selected from the formula 1 is expressed as follows:

Formulae (1-15) to (1-22)

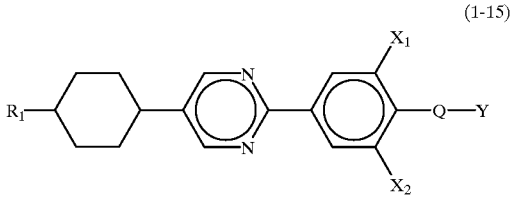
(1-15)

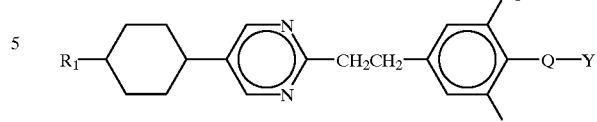
(1-16)

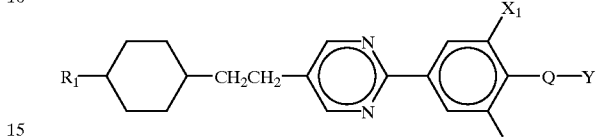
(1-17)

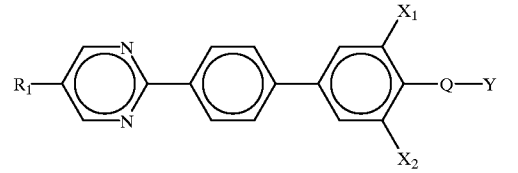
(1-18)

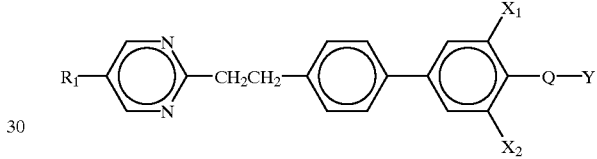
(1-19)

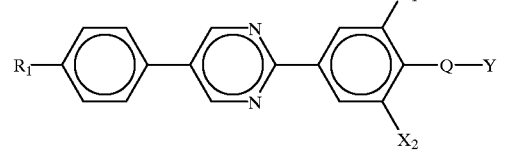
(1-20)

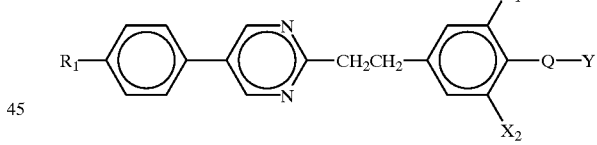
(1-21)

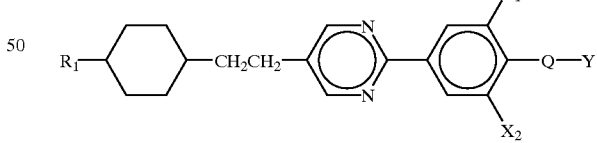
(1-22)

(wherein, $R_1$ is an alkyl group with 1 to 8 carbon atoms,

Q is —$CF_2$—, —$OCF_2$— or a single bond,

Y denotes H, F, Cl or an alkyl group optionally substituted with F atom(s), $X_1$ and $X_2$ are H, Cl or F, and 1,4-phenylene may be substituted with one or more than one F atom(s) and may be 2-fluoro-1,4-phenylene, 3-fluoro-1,4-phenylene, 2,3-difluoro-1,4-phenylene or 3,5-difluoro-1,4-phenylene.).

(10) An electric optical system according to the above-mentioned items (1) to (8) wherein at least one of the compounds selected from the formula 2 is expressed as follows:

Formulae (2-7) to (2-12)

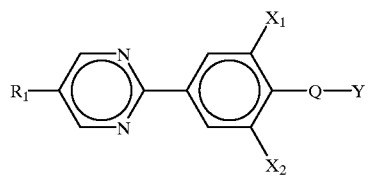
(2-7)

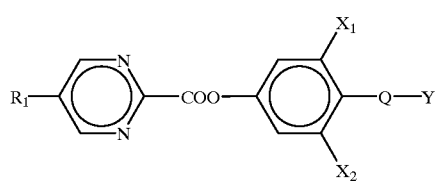
(2-8)

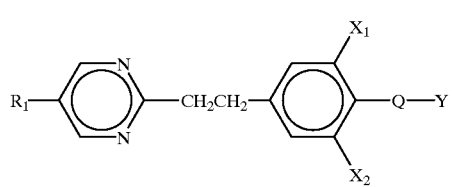
(2-9)

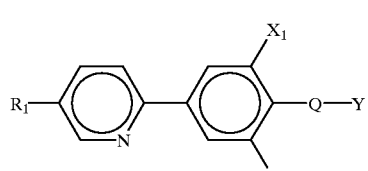
(2-10)

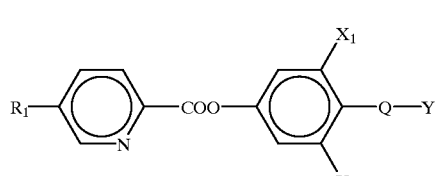
(2-11)

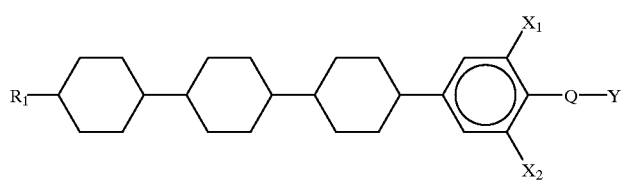
(2-12)

(wherein, $R_1$ is an alkyl with 1 to 8 carbon atoms,

Q is —$CF_2$—, —$OCF_2$— or a single bond,

Y denotes H, F, Cl or an alkyl group optionally substituted with F atom(s), $X_1$ and $X_2$ are H, Cl or F, and 1,4-phenylene imay be substituted with one or more than one F atom(s) and may be 2-fluoro-1,4-phenylene, 3-fluoro1,4-phenylene, 2,3-difluoro-1,4-phenylene or 3,5-difluoro-1,4-phenylene.).

(11) An electric optical system according to the above-mentioned items (1) to (10), wherein at least one of the compounds selected from the formula 3 is expressed as follows:

Formulae (3-1) to (3-4)

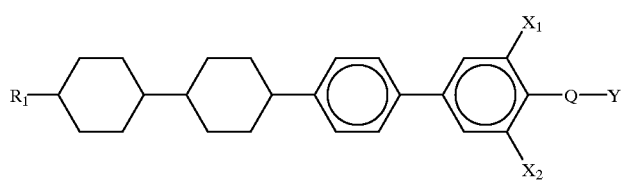
(3-1)

(3-2)

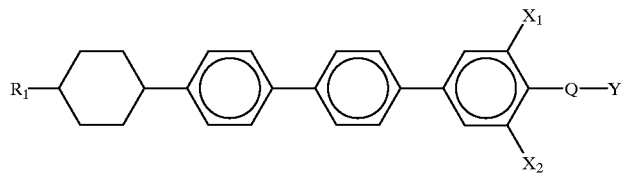

(3-3)

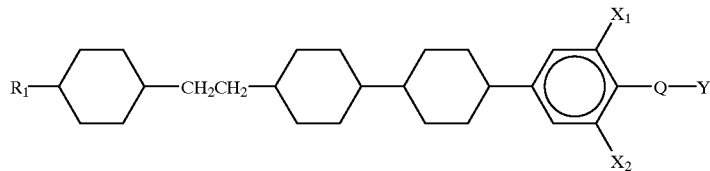

(3-4)

(wherein, $R_1$ is an alkyl group with 1 to 8 carbon atoms,

Q is —$CF_2$—, —$OCF_2$— or a single bond,

Y denotes H, F, Cl or an alkyl group optionally substituted with F atom(s), $X_1$ and $X_2$ are H, Cl or F, and 1,4-phenylene may be substituted with one or more than one F atom(s) and may be 2-fluoro-1,4-phenylene, 3-fluoro-1,4-phenylene, 2,3-difluoro-1,4-phenylene or 3,5-difluoro-1,4-phenylene.)

(12) An electric optical system according to the above-mentioned items (1) to (11), wherein a refractive anisotropy of a liquid crystal mixture is $0.06 \leq \Delta n \leq 0.20$, and an elastic modulus ratio is $K_{33}/K_{11} \leq 1.2$.

(13) An electric optical system according to the above-mentioned items (1) to (12), characterized in that there is used an oriented membrane, wherein X in the oriented membrane of the formula 5 is selected from the formulae X1, X2, X4 and X8, and Y in the oriented membrane of the formula 5 is selected from the formulae Y1, Y2, Y4, Y6 and Y7:

Formula 5; Formulae X1, X2, X4 and X8; the Formulae Y1, Y2, Y4, Y6 and Y7

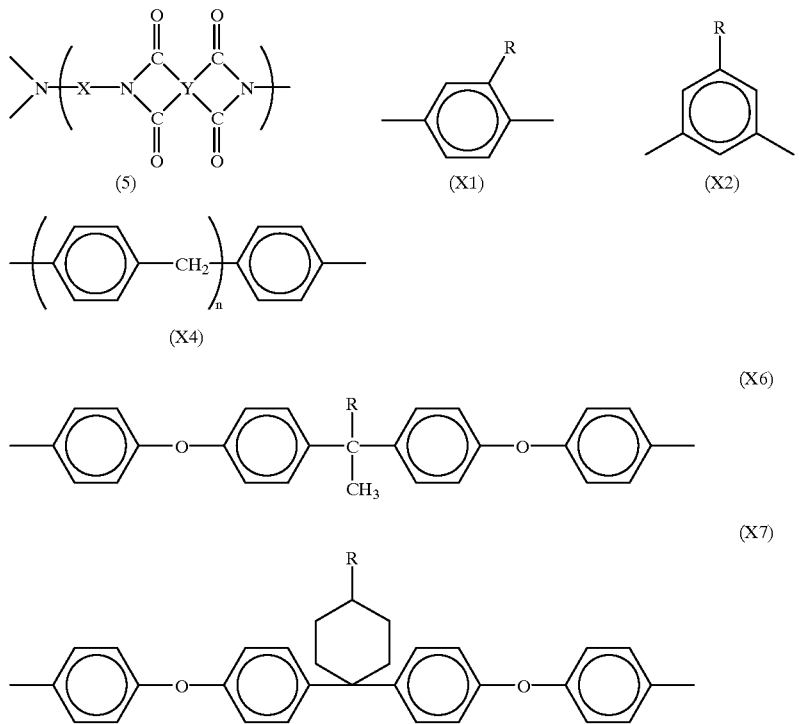

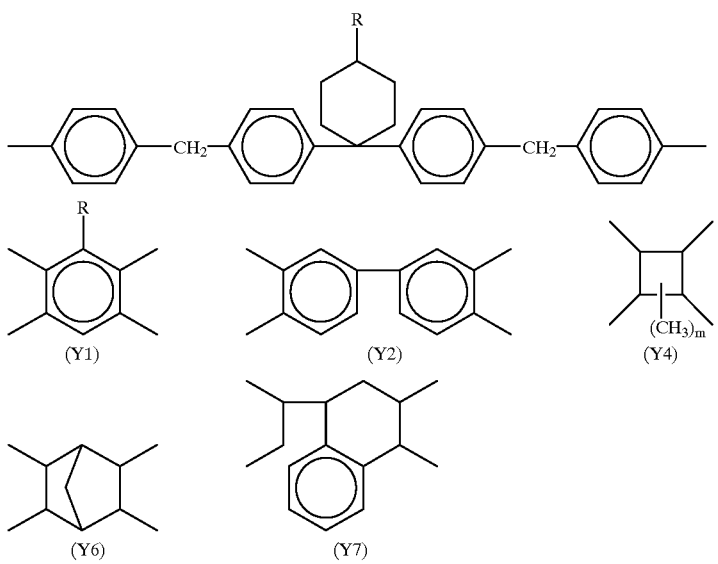

(in the formulae X1, X2, X4 and X8, R represents H or an alkyl group with 1 to 10 carbon atoms, n represents a real number of 1 to 3, and in the formulae Y1, Y2, Y4, Y6 and Y7, R represents H or an allkyl group with 1 to 10 carbon atoms, n represents a real number of 1 to 4.)

(14) An electric optical system according to the above-mentioned item (13), characterized in that there is used an oriented membrane of the compound obtained by copolymerizing 60 to 90% of at least one compound expressed by the formulae 6A1, 6A2 and 6A3 with 0 to 40% of at least one compound expressed by the formulae 6B1 and 6B2 and/or furthermore with 0 to 20% of at least one diamine having (a) side chain(s) of the formulae 6C1 and 6C2 as the compound of the formula 5:

Formulae 6A1 to 6A3; Formulae 6B1 to 6B2; Formulae 6C1 to 6C2

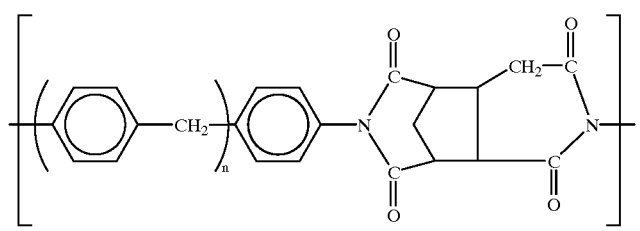

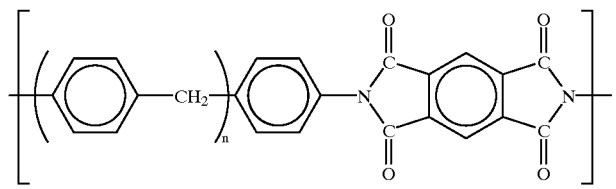

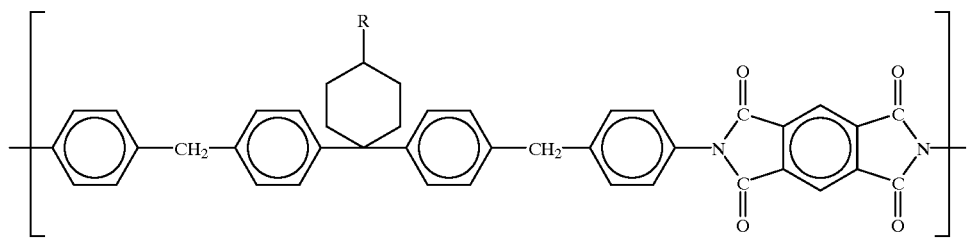

-continued

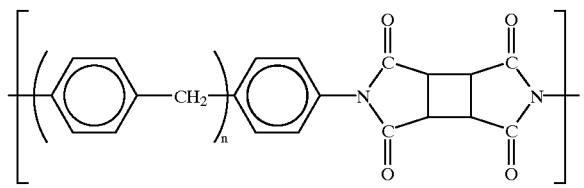
(6B1)

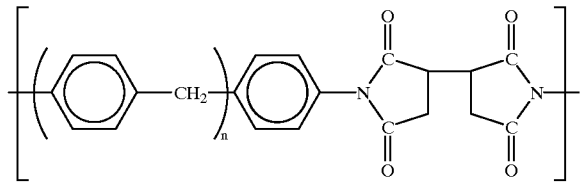
(6B2)

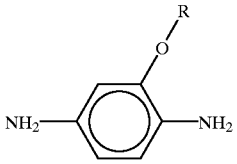
(6C1)

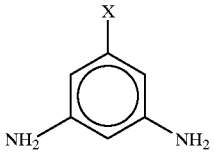
(6C2)

(in the formula 5, X represents a bivalent aromatic group, Y represents a tetravelent aromatic ring or an aliphatic ring with 4, 5 or 6-ring structure, and in the formulae 6A1 to 6A3, R represents H or an alkyl group with 1 to 10 carbon atoms, n represents a real number of 1 to 3, and in the formulae 6B1 to 6B2, n represents a real number of 1 to 3, and in the fomulae 6C1 to 6C2, X represents R—O— or R—, and R represents an alkyl group with 5 to 20 carbon atoms.)

Constitutions and effects of the invention are described in detail as follows.

Figure 1:
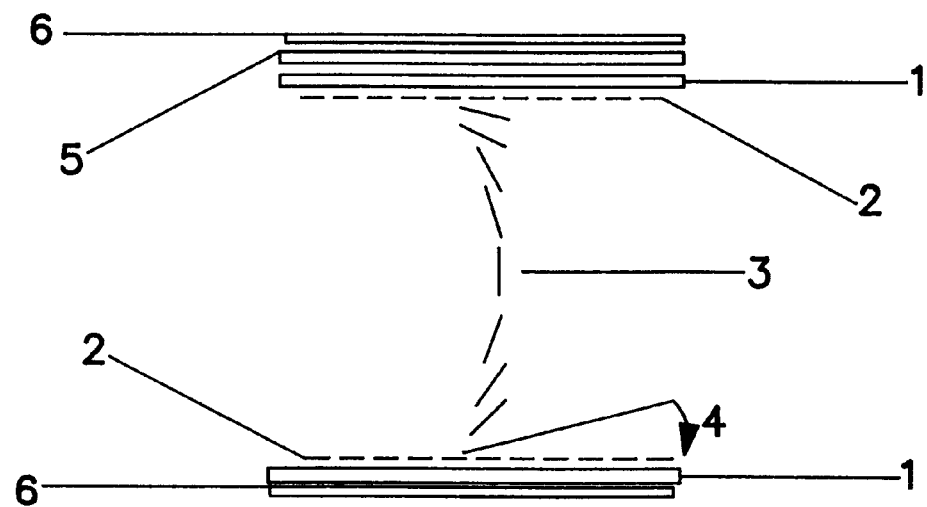
FIG. 1 shows an example of one cell the electric optical system according to the invention.

Furthermore, in order to obtain a high contrast and a wide visual range in the electric optical system according to the invention, liquid crystal materials are necessary to have low $K_{33}/K_{11}$, preferably $K_{33}/K_{11}$ less than 1.5 and more preferably less than 1.2.

A characteristic of OCB cells on driving is to drive liquid crystal molecules in a bend oriented state in cells. However, since they have spray orientation states in the case of without any applied voltage, they should be driven within a voltage range higher than a conversion voltage range ($V_{CR}$) which converts from a spray orientation to a bend orientation. Magnitude of the conversion voltage range ($V_{CR}$) depends on respective absolute values of a bend elastic constant $K_{33}$ and a spray elastic constant $K_{11}$ as well as on their ratios $K_{33}/K_{11}$, if dielectric anisotropies ($\Delta\epsilon$) of liquid crystal compositions being same, and the smaller the respective absolute values of both elastic constants $K_{33}$ and $K_{11}$ as well as their ratios $K_{33}/K_{11}$, the smaller their conversion voltage ranges (VCR). That is, smaller $K_{33}/K_{11}$, ratios tend to have a bend oriented state and promote a conversion rate from a spray oriented state to a bend oriented state. Furthermore, the higher the pre-tilt angle, the faster the conversion rate. (Liquid Crystal Forum, P. 396–397, 1993)

The compounds of the formula 1 are expressed for example by the formulae (1-1) to (1-22):

Formula 1-1 to 1-22

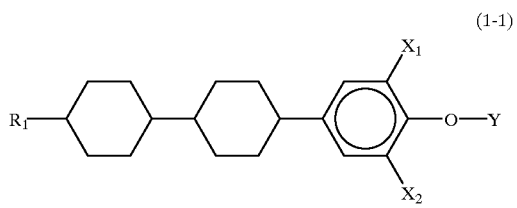
(1-1)

-continued (1-2) (1-10) (1-3) (1-11) (1-4) (1-12) (1-5) (1-13) (1-6) (1-14) (1-7) (1-15) (1-8) (1-16) (1-9) (1-17)

-continued

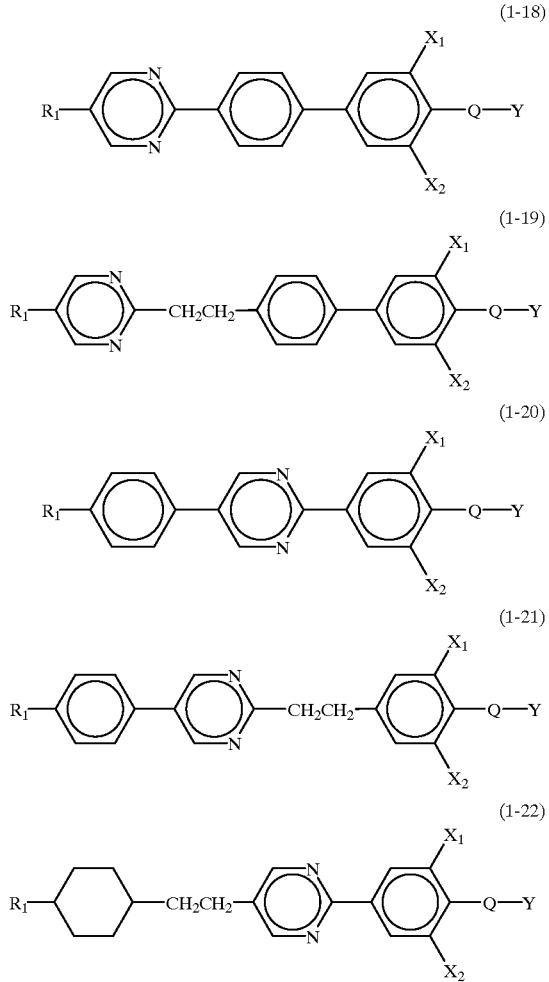

Furthermore, the compounds of the formula 1 are preferably expressed by the following chemical structure:
Formula 1

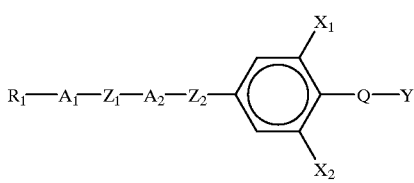

(wherein, $R_1$ is an alkyl group with 1 to 8 carbon atoms or an alkenyl group with up to 7 carbon atoms, $Z_1$ and $Z_2$ denote independently from each other —$CH_2CH_2$— or a single bond, Q is —$CF_2$—, —$OCF_2$—, —$OCF_2CFHCF_2$ or a single bond, Y denotes H, F, Cl or an alkyl group optionally substituted with F atom(s), $X_1$ and $X_2$ are H, Cl or F, $A_1$ and $A_2$ are independently from each other trans-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene, pyrimidine-2,5-diyl or pyridine-2,5-diyl.).

More preferably, the above-mentioned formula 1 is as follows:
Formula 1

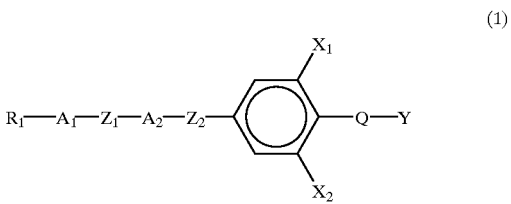

(wherein, $R_1$ is an alkyl group with 1 to 8 carbon atoms, $Z_1$ and $Z_2$ denote independently from each other —$CH_2CH_2$— or a single bond, Q is —$CF_2$—, —$OCF_2$—, —$OCF_2CFHCF_2$— or a single bond, Y denotes H, F, Cl or an alkyl group optionally substituted with F atom(s), X1 and $X_2$ are H, Cl or F, $A_1$ and $A_2$ are independently from each other trans-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene, pyrimidine-2,5-diyl or pyridine-2,5-diyl, with the proviso that either of $A_1$ and $A_2$ is pyrimidine-2,5-diyl or pyridine-2,5-diyl.).

More preferably, at least one of the compounds selected from the formula 1 is expressed as follows:

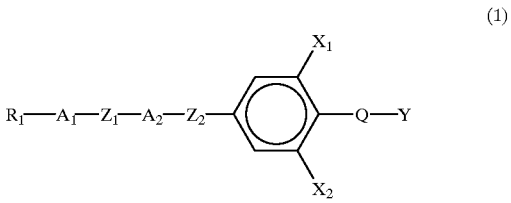

(wherein, $R_1$ is an alkyl group with 1 to 8 carbon atoms,

Q is —$CF_2$—, —$OCF_2$— or a single bond,

Y denotes H, F, Cl or an alkyl group optionally substituted with F atom(s), $X_1$ and $X_2$ are H, Cl or F, and 1,4-phenylene may be substituted with one or more than one F atom(s) and may be 2-fluoro-1,4-phenylene, 3-fluoro-1,4-phenylene, 2,3-difluoro-1,4-phenylene or 3,5-difluoro-1,4-phenylene.).

The compounds of the formula 2 are expressed for example by the formulae (2-1) to (2-12):
Formulae 2-1 to 2-12

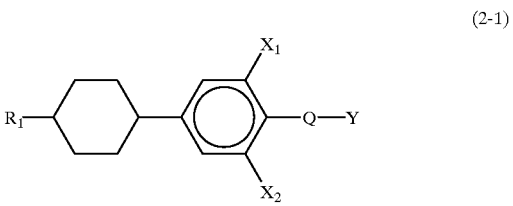

(2-2) 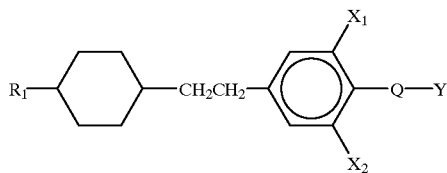

(2-3) 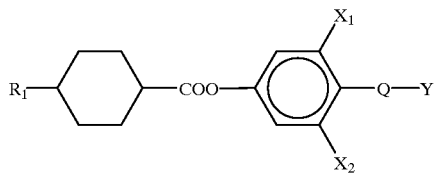

(2-4) 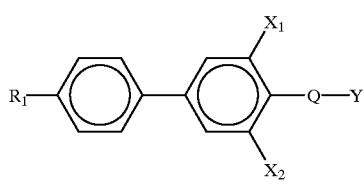

(2-5) 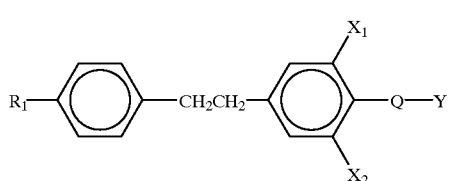

(2-6) 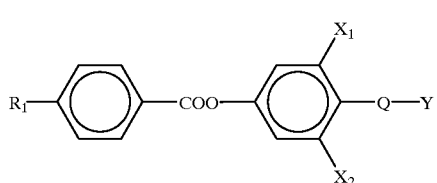

(2-7) 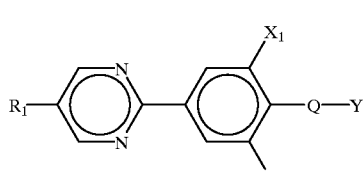

(2-8) 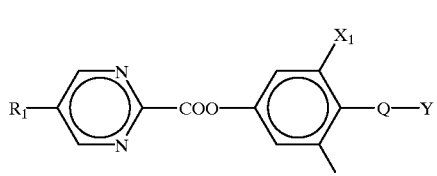

(2-9) 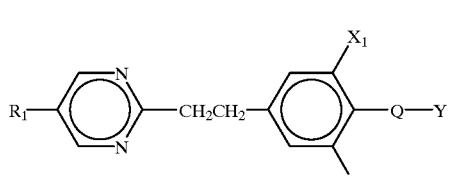

(2-10) 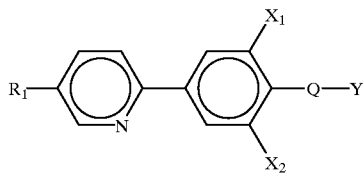

(2-11) 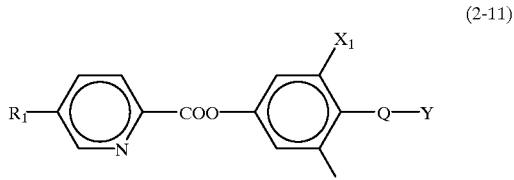

(2-12) 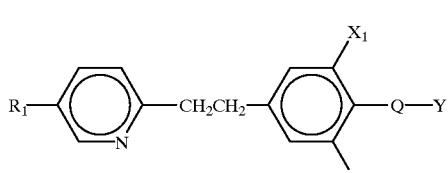

Preferably, the compounds of the formula 2 are as follows:

Formula 2

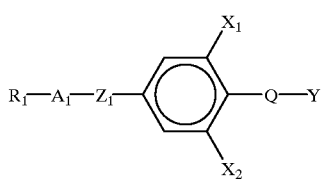

(2)

(wherein, $R_1$ is preferably an alkyl with 1 to 8 carbon atoms, or an alkenyl with up to 7 carbon atoms, $Z_1$ denotes —$CH_2CH_2$— or a single bond, Q is —$CF_2$—, —$OCF_2$— or a single bond, Y denotes H, F, Cl or an alkyl group optionally substituted with F atom(s), $X_1$ and $X_2$ are H, Cl or F, $A_1$ is trans-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene, pyrimidine-2,5-diyl or pyridine-2,5-diyl.).

More preferably, at least one of the compounds selected from the formula 2 is expressed as follows:

Formula 2

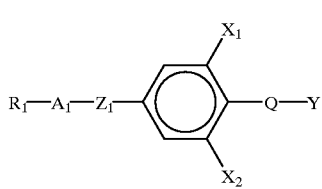

(2)

(wherein, $R_1$ is preferably an alkyl with 1 to 8 carbon atoms, or an alkenyl with up to 7 carbon atoms, $Z_1$ denotes —$CH_2CH_2$— or a single bond, Q is —$CF_2$—, —$OCF_2$— or a single bond, Y denotes H, F, Cl or an alkyl group optionally substituted with F atom(s), $X_1$ and $X_2$ are H, Cl or F, $A_1$ is pyrimidine-2,5-diyl or pyridine-2,5-diyl.).

More preferably, at least one of the compounds selected from the formula 2 is expressed as follows:

Formula 2

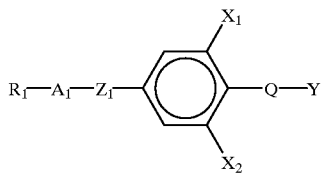

(2)

(wherein, $R_1$ is preferably an alkyl with 1 to 8 carbon atoms,
 Q is —$CF_2$—, —$OCF_2$— or a single bond,
 Y denotes H, F, Cl or an alkyl group optionally substituted with F atom(s) at H atom(s), and
 $X_1$ and $X_2$ are H, Cl or F.).

The compounds of the formula 3 are expressed for example by the following formulae (3-1) to (3-16):

Formulae 3-1 to 3-16

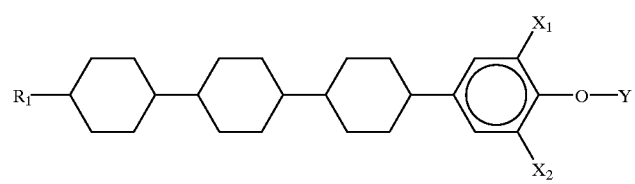

(3-1)

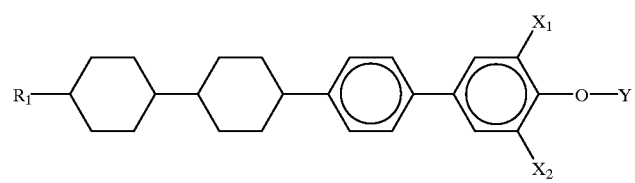

(3-2)

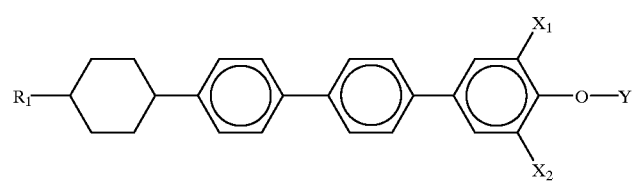

(3-3)

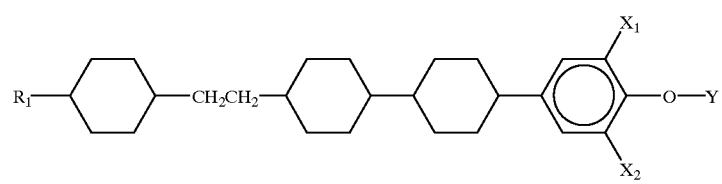

(3-4)

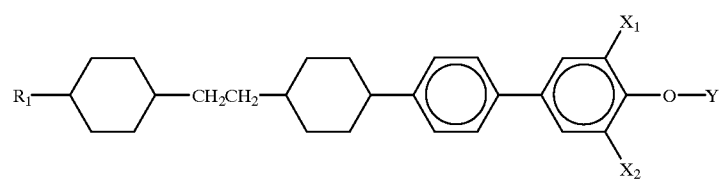

(3-5)

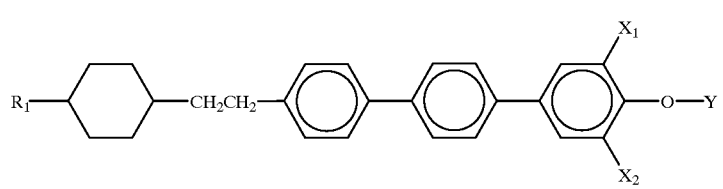
(3-6)
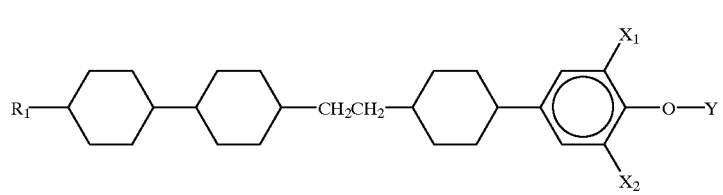
(3-7)
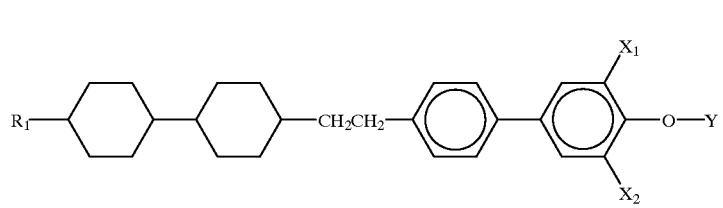
(3-8)
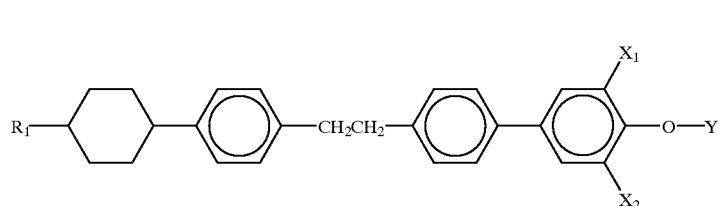
(3-9)
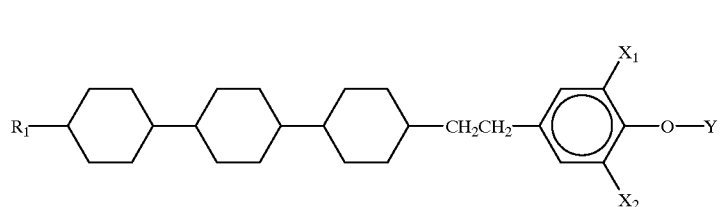
(3-10)
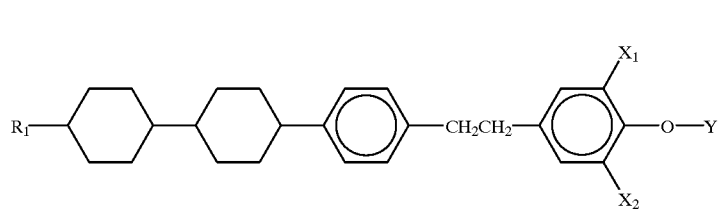
(3-11)
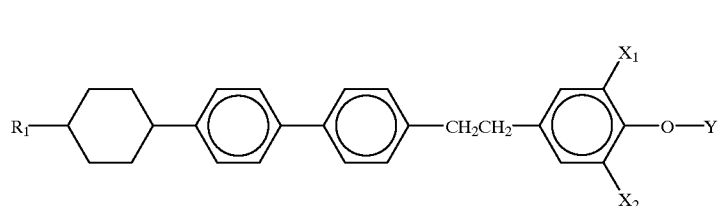
(3-12)
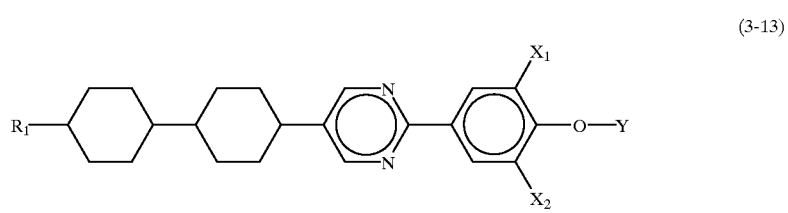
(3-13)

(3-14)

(3-15)

(3-16)

Preferably, the compounds of the formula 3 are expressed as follows:

Formula 3

(3)

(wherein, $R_1$ is preferably an alkyl group with 1 to 8 carbon atoms, $Z_1$, $Z_2$ and $Z_3$ denote independently from each other —$CH_2CH_2$— or a single bond, Q is —$CF_2$—, —$OCF_2$— or a single bond, Y denotes H, F, Cl or an alkyl group optionally substituted with F atom(s), $X_1$ and $X_2$ are H, Cl or F, $A_1$, $A_2$ and $A_3$ are independently from each other trans-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene, pyrimidine-2,5-diyl or pyridine-2,5-diyl.).

More preferably, the compounds are as follows:

Formula 3

(3)

(wherein, $R_1$ is preferably an alkyl group with 1 to 8 carbon atoms, $Z_1$, $Z_2$ and $Z_3$ denote independently from each other —$CH_2CH_2$— or a single bond, Q is —$CF_2$—, —$OCF_2$— or a single bond, Y denotes H, F, Cl or an alkyl group optionally substituted with F atom(s), $X_1$ and $X_2$ are H, Cl or F, $A_1$, $A_2$ and $A_3$ are independently from each other trans-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene, pyrimnidine-2,5-diyl or pyridine-2,5-diyl, with the proviso that either one of $A_1$, $A_2$ and $A_3$ is pyrimidine-2,5-diyl or pyridine-2,5-diyl.).

More preferably, at least one of the compounds selected from the formula 3 is expressed as follows:

Formulae 3

(3)

(wherein, $R_1$ is an alkyl group with 1 to 8 carbon atoms,

Q is —$CF_2$—, —$OCF_2$— or a single bond,

Y denotes H, F, Cl or an alkyl group optionally substituted with F atom(s), $X_1$ and $X_2$ are H, Cl or F, and 1,4-phenylene may be substituted with one or more than one F atom(s) and may be 2-fluoro-1,4-phenylene, 3-fluoro-1,4-phenylene, 2,3-difluoro-1,4-phenylene or 3,5-difluoro-1,4-phenylene.)

Compounds of the formulae 4A and 4B are expressed for example by the formulae (4-1) to (4-68):

Formulae 4-1 to 4-68

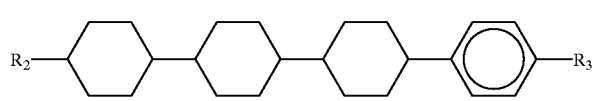
(4-1)
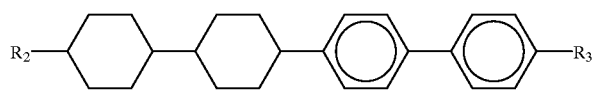
(4-2)
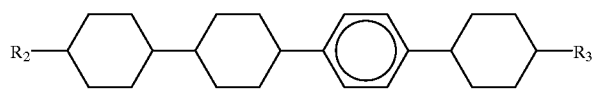
(4-3)
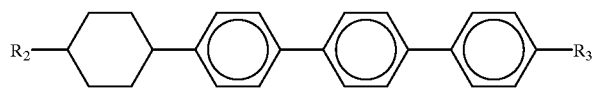
(4-4)
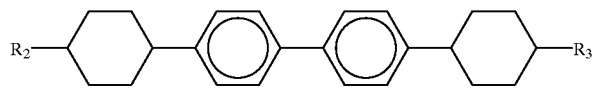
(4-5)
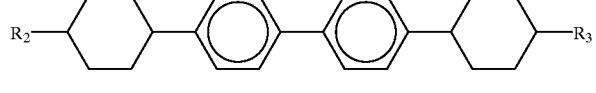
(4-6)
(4-7)
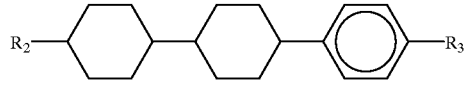
(4-8)
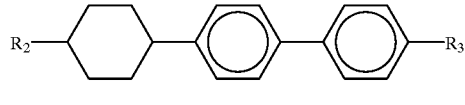
(4-9)
(4-10)
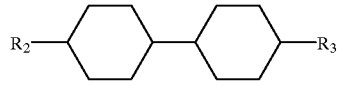
(4-11)
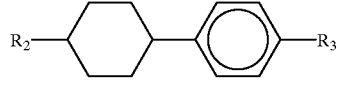
(4-12)
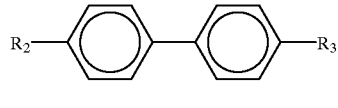
(4-13)
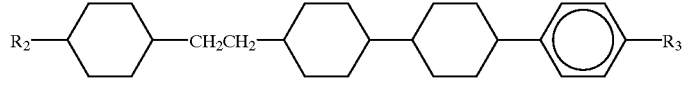
(4-14)
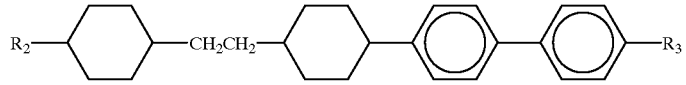

-continued
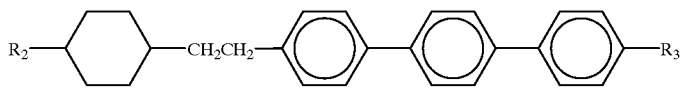
(4-15)
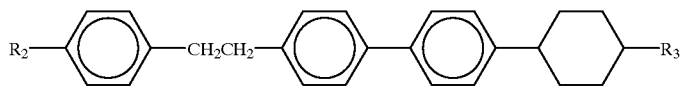
(4-16)
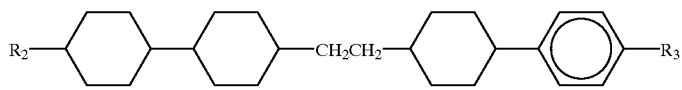
(4-17)
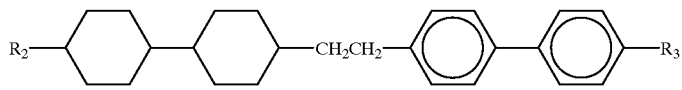
(4-18)
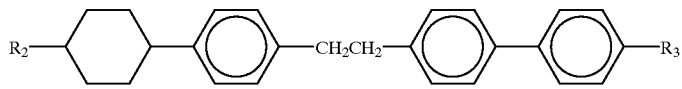
(4-19)
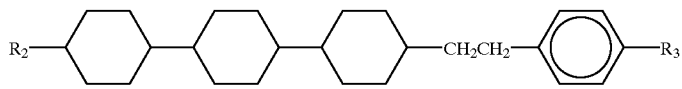
(4-20)
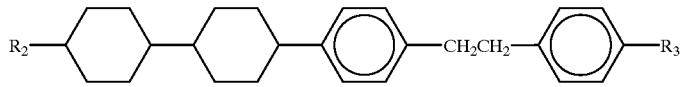
(4-21)
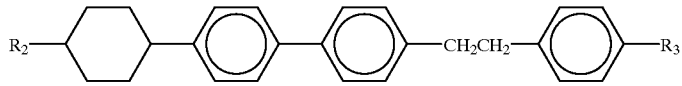
(4-22)
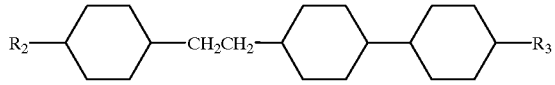
(4-23)
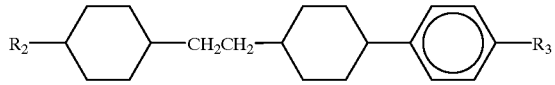
(4-24)
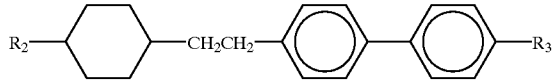
(4-25)
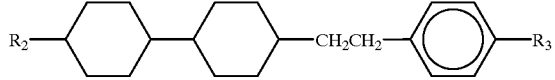
(4-26)
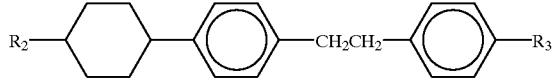
(4-27)
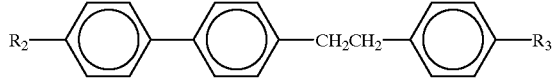
(4-28)

-continued
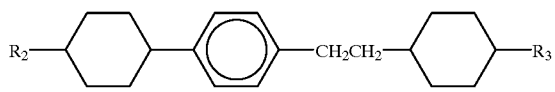
(4-29)
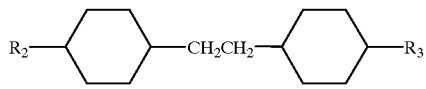
(4-30)
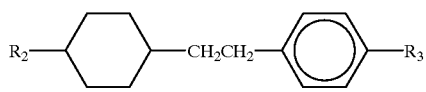
(4-31)
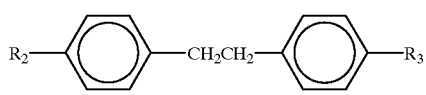
(4-32)
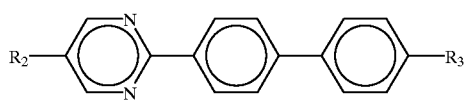
(4-33)
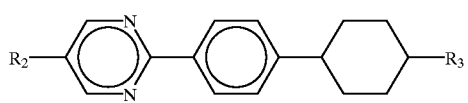
(4-34)
(4-35)
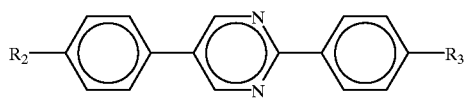
(4-36)
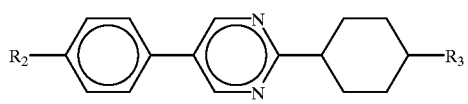
(4-37)
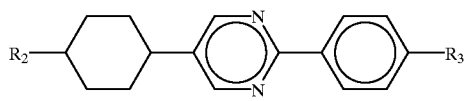
(4-38)
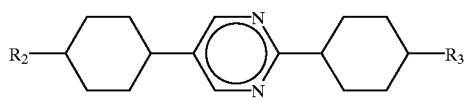
(4-39)
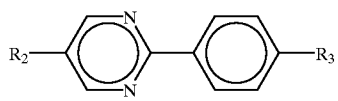
(4-40)
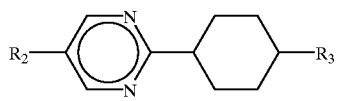
(4-41)

-continued
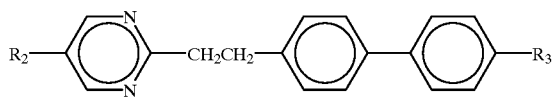
(4-42)
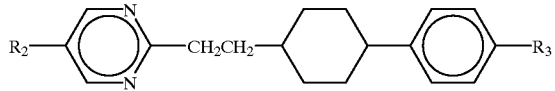
(4-43)
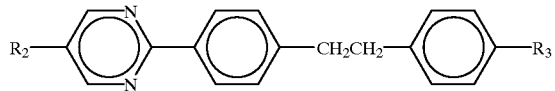
(4-44)
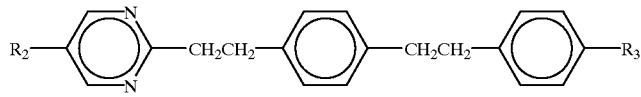
(4-45)
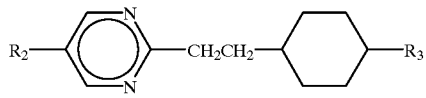
(4-46)
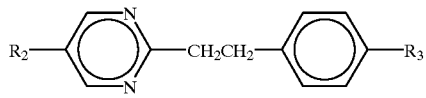
(4-47)
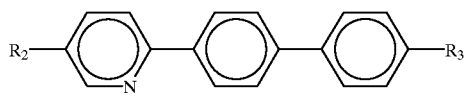
(4-48)
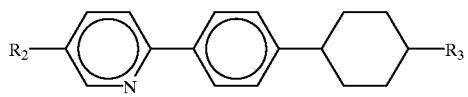
(4-49)
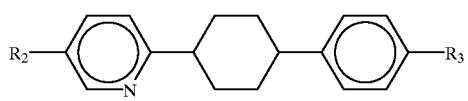
(4-50)
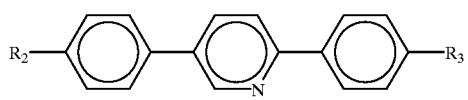
(4-51)
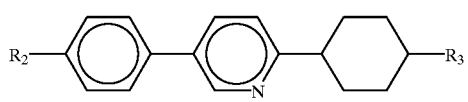
(4-52)
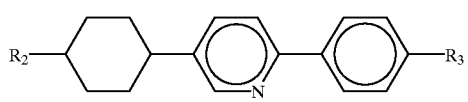
(4-53)
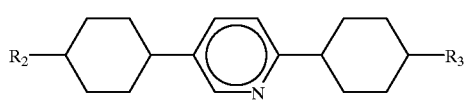
(4-54)

-continued
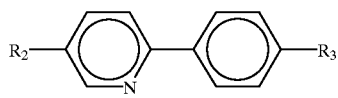
(4-55)
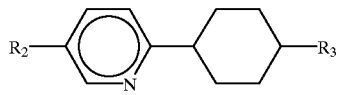
(4-56)
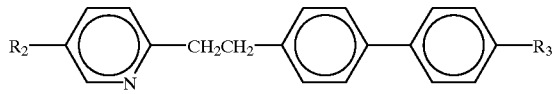
(4-57)
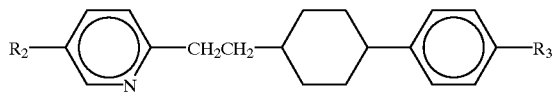
(4-58)
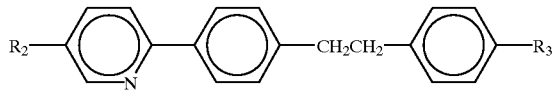
(4-59)
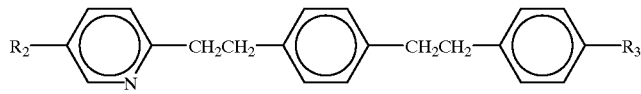
(4-60)
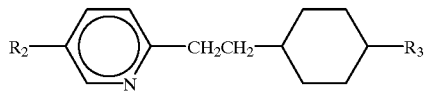
(4-61)
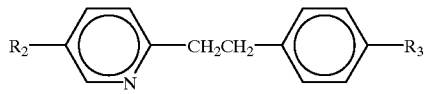
(4-62)
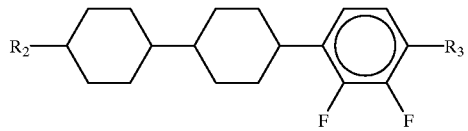
(4-63)
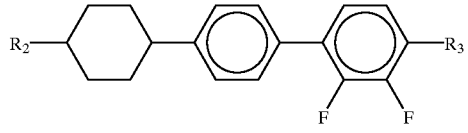
(4-64)
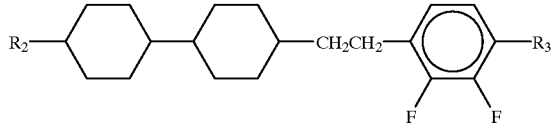
(4-65)
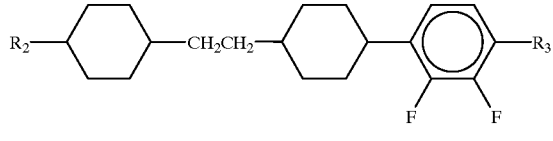
(4-66)

(4-67)

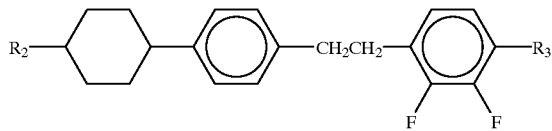

(4-68)

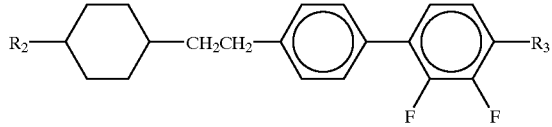

Preferably, compounds of the formulae 4A and 4B are expressed as follows:
Formulae 4A, 4B

 (4A)

 (4B)

(in the formulae 4A and 4B, substituents L and E denote independently from each other -Phe-, -Cyc-, -Phe-Phe-, -Phe-Cyc-, -Cyc-Cyc-, -Pyr-, -G-Phe-, -G-Cyc- and enantiomers, wherein -Phe- denotes 1,4-phenylene optionally substituted with F atom(s), -Cyc- denotes trans-1,4-cyclohexylene or trans-1,4-cyclohexenylene, -Pyr- denotes pyrimidine-2,5-diyl or pyridine-2,5-diyl, -G- denotes 2-(trans-1,4-cyclohexyl)ethyl, pyrimidine-2,5-diyl or pyridine-2,5-diyl, and one of substituents L and E is -Phe-, -Cyc-, -Pyr- or -Phe-Cyc-, and in the formulae 4A and 4B, R1 and R2 are independently from each other an alkyl with up to 8 carbon atoms.).

Preferably, X in the formula 5 for the oriented membrane is selected from the formulae X1, X2, X4 and X8, and Y in the formula 5 is selected from the formulae Y1, Y2, Y4, Y6 and Y7.

Formula 5; Formulae X1, X2, X4 and X8; Formulae Y1, Y2, Y4, Y6 and Y7

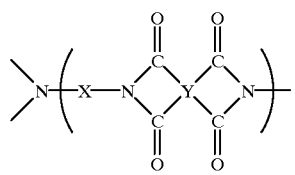 (5)

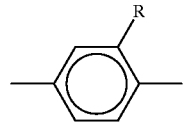 (X1)

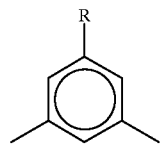 (X2)

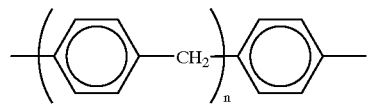 (X4)

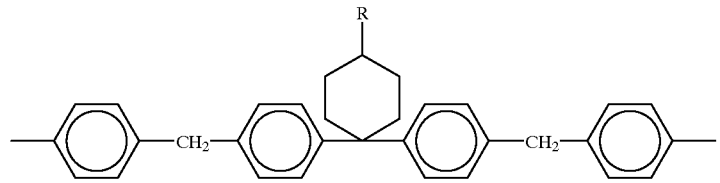 (X8)

-continued

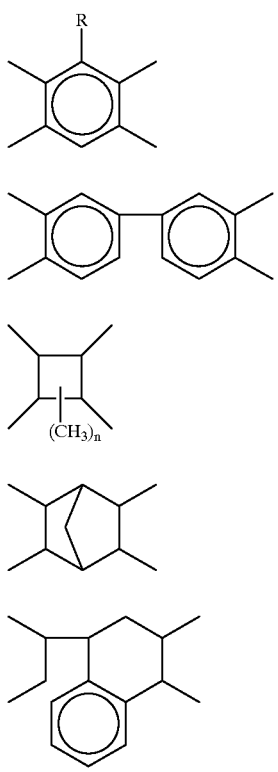

(Y1)

(Y2)

(Y4)

(Y6)

(Y7)

(in the formulae X1, X2, X4 and X8, R represents H or an alkyl group with 1 to 10 carbon atoms, n represents a real number of 1 to 3, and in the formulae Y1, Y2, Y4, Y6 and Y7, R represents H or an alkyl group with 1 to 10 carbon atoms, n represents a real number of 1 to 4.).

More preferably, 60 to 90% of at least one compound expressed by the formulae 6A1, 6A2 and 6A3 is copolymerized with 0 to 40% of at least one compound expressed by the formulae 6B1 and 6B2 and/or furthermore, for the purpose of possessing a pre-tilt, with 0 to 20% of at least one diamine having (a) side chain(s) of the formulae 6C1 and 6C2 as the compound of the formula 5:

Formulae 6A1 to 6 A3; Formulae 6B1 to 6B2; Formulae 6C1 to 6C2

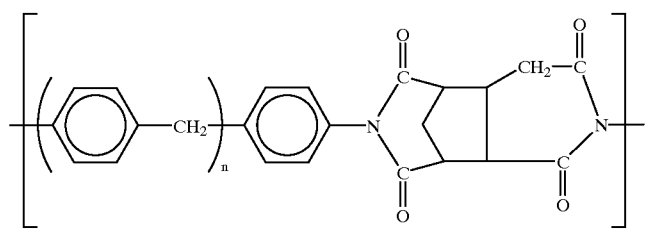

(6A1)

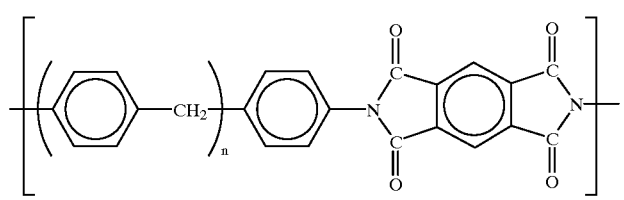

(6A2)

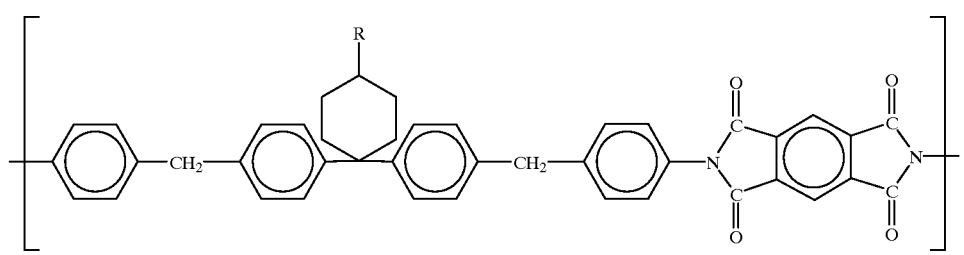
(6A3)

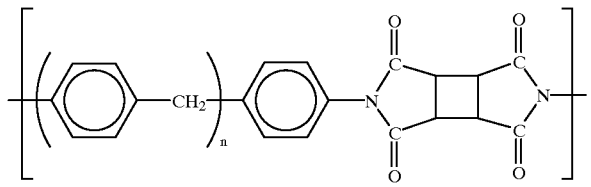
(6B1)

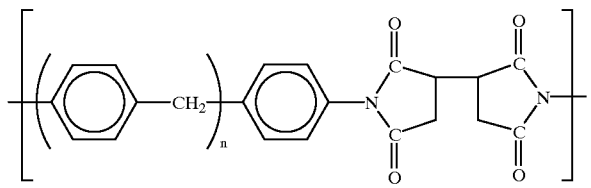
(6B2)

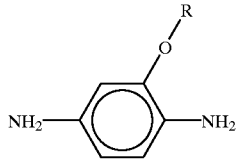
(6C1)

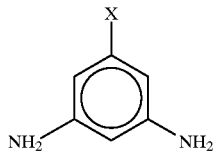
(6C2)

(in the formulae 6A1 to 6A3, R represents H or an alkyl group with 1 to 10 carbon atoms, n represents a real number of 1 to 3, and in the formulae 6B1 to 6B2, n represents a real number of 1 to 3, and in the fomulae 6C1 to 6C2, X represents R—O— or R—, and R represents an alkyl group with 5 to 20 carbon atoms.).

For example, in the case that 6A1, 6B1 and 6C1 being copolymerized, they are expressed by the following formulae:

Formulae 6D1, 6D2

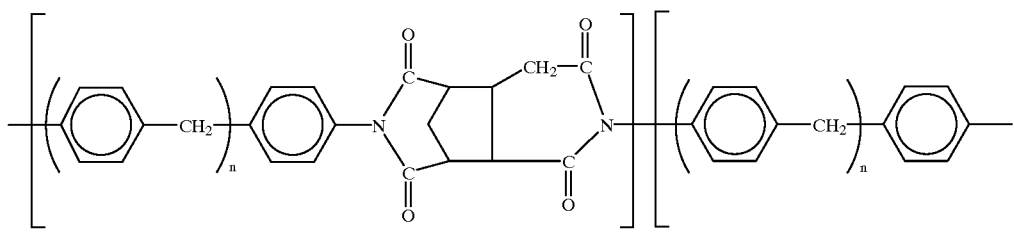
(6D1)

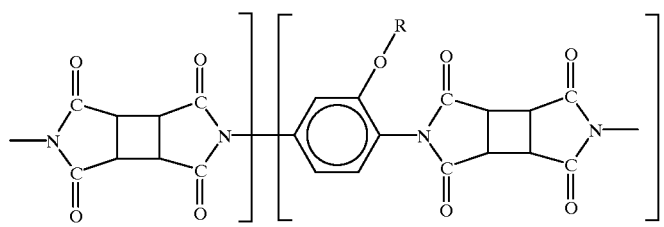

(6D2)

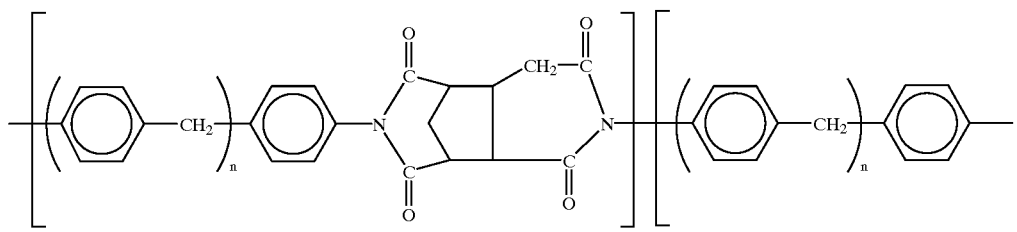

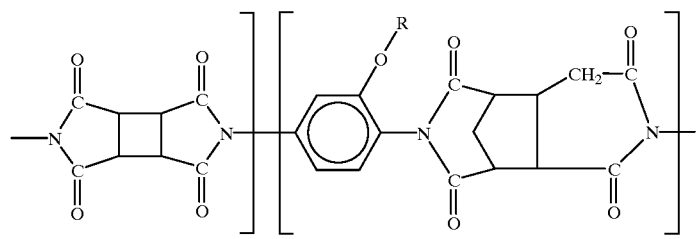

(wherein, R represents H or an alkyl group with 1 to 10 carbon atoms, n represents a real number of 1 to 3.).

In the liquid crystal mixture according to the invention, it is preferable to contain more than 60%, preferably more than 80% and more preferably 100% of at least one compound selected from a group consisting of liquid crystal and liquid crystalline compounds of the formula 1 and/or the formulae 2 to 5. Furthermore, commercially available chiral dopants may be contained according to purposes. The liquid crystal mixture according to the invention has $\Delta\epsilon \geq 1$ and a positive dielectric value. The liquid crystal mixtures with $\Delta\epsilon \geq 3$ are particularly desirable.

The liquid crystal mixture according to the invention has preferable values as to a threshold voltage value and a viscosity. If an optical path length $\Delta n \cdot d$ being specified, a value of d is determined by an optical anisotropy value $\Delta n$. In the case of larger $\Delta n \cdot d$, the value of d can be selected as small, which results in a preferable response time. The liquid crystal mixture according to the invention is characterized by an advantageous value as to a sharpness of an electric characteristic curve. In addition, the liquid crystal mixture according to the invention is highly stable and has preferable values as to dependencies of an electric resistance and a threshold voltage value on a frequency and a temperature. The electric optical system according to the invention has a wide active temperature range, a high contrast and a good angle dependency.

The constitution of the electric optical system elements according to the invention consisting of electrodes which are subjected to such a surface treatment that a preferable direction of the respective liquid crystal molecules (a director) contacted with the respective electrode being bend-oriented in a vertical direction to the upper and lower substrates, polarizers and/or biaxial birefringent films and electrode substrates, is the same as that of the liquid crystal display elements with the general structure.

A pre-tilt angle of the electric optical system according to the invention is 0 to 20°, preferably 1 to 10°. Furthermore, $\Delta n \cdot d$ of the electric optical system according to the invention is $0.3 \leq \Delta n \cdot d \leq 1.2$, preferably $0.5 \leq \Delta n \cdot d \leq 1.1$.

Conception of "general constitution" used here has a wide meaning, and includes all variants of $\pi$ cells and OCB cells. Amongst them, an active matrix element is included. Surface tilt angles of the upper and lower substrates may be same or different. Equal tilt angles are more preferable. However, an essential difference between the liquid crystal display element according to the invention and the conventional one exists in a selection of liquid crystal components of liquid crystal layer thereof and a selective combination of the oriented membrane.

The liquid crystal mixture which can be used according to the invention may be prepared by the known methods. Desired amounts of components being used in amounts lesser than the general ones are dissolved into major components of the mixture at a preferably raised temperature. Those derivatives may contain furthermore various additives which are known to the art and described in literatures. For example, it is possible to add 0 to 20% of multichromatic dyestuffs, in more detail, bichromatic dyestuffs of merocyanine type, styryl type, azo type, azomethine type, azoxy type, quinophthalone type, anthraquinone type and tetrazine type etc.

EXAMPLES

OCB cells were prepared by combining liquid crystal mixtures according to the invention with oriented membranes expressed by the formula 6D1 or 6D2:

Formulae 6D1, 6D2

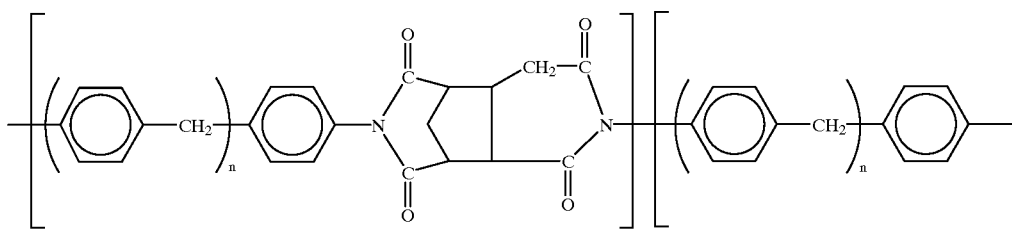

(6D1)

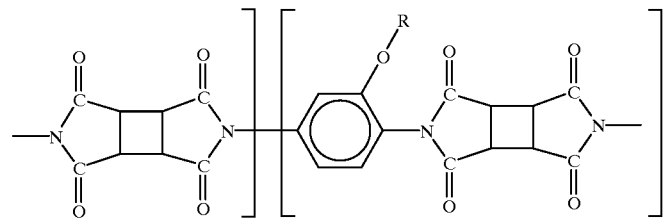

(6D2)

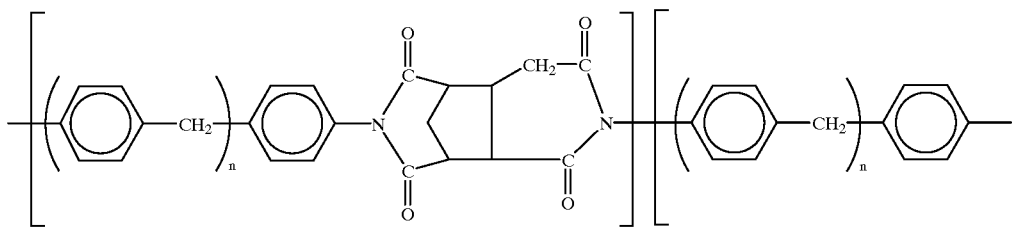

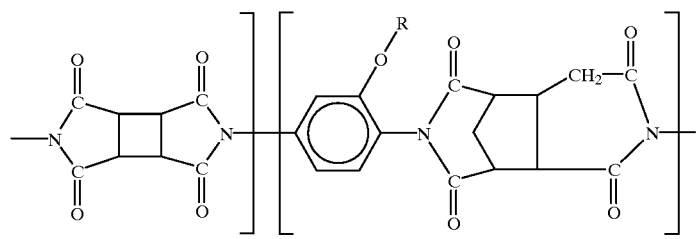

(in the formulae 6D1 and 6D2, R represents H or an alkyl group with 1 to 20 carbon atoms, and n represents a real number of 1 to 3.)

The invention is illustrated by the following Examples, but the invention is not limited by these Examples. Furthermore, composition ratios of liquid crystal mixtures in Examples are all expressed by weight parts.

Herein, compounds used in Examples are expressed by symbols based on definitions shown in Table 1.

Example 1

A liquid crystal mixture consisting of
2-HBB(F)-F 10 parts
3-HBB(F)-F 10 parts
5-HBB(F)-F 10 parts
3-H2BB(F)-F 10 parts
4-H2BB(F)-F 10 parts
5-H2BB(F)-F 10 parts
3-HBB(F,F)-F 10 parts
5-HBB(F,F)-F 10 parts
3-HBB-F 10 parts
5-HBB-F 10 parts.
was prepared. The transparent point of the liquid crystal mixture was 80.3° C.

Example 2

A liquid crystal mixture consisting of
7-HB-CL 10 parts
3-HHB-CL 5 parts
4-HHB-CL 10 parts
5-HHB-CL 5 parts
3-H2BB(F)-F 10 parts
4-H2BB(F)-F 10 parts
5-H2BB(F)-F 10 parts
3-H2HB(F)-F 10 parts
4-H2HB(F)-F 10 parts
5-H2HB(F)-F 10 parts
2-HHB(F)-F 10 parts.
was prepared. The transparent point of the liquid crystal mixture was 93.6° C.

Liquid crystal mixtures of the following Examples 3 to 8 were prepared and their voltage holding ratios (V.H.R.) in OCB cells were determined. Respective results are shown in Table 2.

Example 3

3-HHEB-F 5 parts
5-HHEB-F 5 parts
3-HBEB-F 6 parts
3-PyBB-F 8 parts
4-PyBBF 8 parts
5-PyBB-F 8 parts
2-PyBH-3 4 parts
3-PyBH-3 4 parts
4-PyBH-3 4 parts
3-PyB(F)-F 11 parts
5-PyB(F)-F 12 parts
3-HB-02 20 parts
4-HEB-02 5 parts

Example 4

3-HHEB-F 5 parts
5-HHEB-F 5 parts
3-HBEB-F 6 parts
3-PyBB-F 7 parts
2-HHB(F)-F 8 parts
3-HHB(F)-F 8 parts
5-HHB(F)-F 9 parts
2-HBB(F)-F 7 parts
3-HBB(F)-F 7 parts
5-HBB(F)-F 9 parts
3-PyB(F)-F 12 parts
7-HB(F)-F 11 parts

Example 5

2-PyBH-3 7 parts
3-PyBH-3 7 parts
4-PyBH-3 7 parts
4-PyBB-2 4 parts
6-PyBB-2 4 parts
4-PyBB-3 4 parts
6-PyBB-3 4 parts
3-HHB-1 5 parts
3-HHB-3 10 parts
2-PyB-3 7 parts
2-PyB-4 7 parts
2-PyB-5 6 parts

Example 6

2-HHB(F)-F 8 parts
2-HBB(F)-F 8 parts
3-HBB(F)-F 8 parts
5-HBB(F)-F 10 parts
3-HBB(F,F)-F 15 parts
5-HBB(F,F)-F 15 parts
3-HBB-F 4 parts
5-HBB-F 3 parts
7-HB(F,F)-F 3 parts
3-HB-02 7 parts
3-HH-4 4 parts
3-HBTB-2 5 parts
3-HBTB-3 5 parts
3-HBTB-4 5 parts

Example 7

3-HHEB-F 3 parts
3-PyBB-F 9 parts
4-PyBB-F 8parts
5-PyBB-F 8 parts
3-PyB(F)-F 1 parts
5-PyB(F)-F 12 parts
2-PyBH-3 4 parts
3-PyBH-3 4 parts
4-PyBH-3 4 parts
3-HB-02 15 parts
2-PyB-3 7 parts
2-PyB-4 6 parts

Example 8

3-HHEB-F 5 parts
5-HHEB-F 5 parts
3-HBEB-F 6 parts
3-PyBB-F 6 parts
4-PyBB-F 5 parts
2-HHB(F)-F 8 parts
3-HHB(F)-F 8 parts
5-HHB(F)-F 9 parts
2-HBB(F)-F 7 parts
3-HBB(F)-F 7 parts
5-HBB(F)-F 9 parts
3-PyB(F)-F 14 parts
7-HB(F)-F 11 parts

TABLE 1

R—(A₁)—Z₁——————Zₙ—(Aₙ)—X

| | Symbol |
|---|---|
| 1) Left terminal group R— | |
| $C_nH_{2n+1}-$ | n— |
| $C_nH_{2n+1}O-$ | nO— |
| $C_nH_{2n+1}OC_mH_{2m}-$ | nOm— |
| $CH_2=CH-$ | V— |
| $CH_2=CHC_nH_{2n}-$ | Vn— |
| $C_nH_{2n+1}CH=CHC_mH_{2m}-$ | nVm— |
| $C_nH_{2n+1}CH=CHC_mH_{2m}CH=CHC_kH_{2k}-$ | nVmVk— |

TABLE 1-continued
R—(A₁)—Z₁——————Z_n—(A_n)—X
| | Symbol |
|---|---|
2) Ring structure —(A₁)—, —(A_n)—
  B
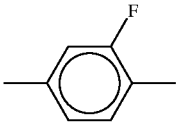  B(F)
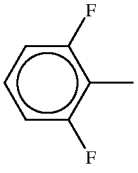  B(F,F)
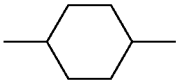  H
  Py
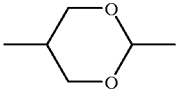  D
  Ch
3) Bonding group —Z₁—, —Z_n—
| | |
|---|---|
| —C₂H₄— | 2 |
| —C₄H₈— | 4 |
| —COO— | E |
| —C≡C— | T |
| —CH=CH— | V |
| —CF₂O— | CF2O |
| —OCF₂— | OCF2 |
4) Right terminal group —X
| | |
|---|---|
| —F | —F |
| —Cl | —CL |
| —CN | —C |
| —CF₃ | —CF3 |
| —OCF₃ | —OCF3 |
| —OCF₂H | —OCF2H |
| —C_nH_{2n+1} | —n |
| —OC_nH_{2n+1} | —On |
| —COOCH₃ | —EMe |
| —C_nH_{2n}CH=CH₂ | —nV |
| —C_mH_{2m}CH=CHC_nH_{2n+1} | —mVn |

TABLE 1-continued

R―(A₁)―Z₁――――――Z_n―(A_n)―X

Symbol

5) Expression example

Example 1 3-H2B(F,F)B(F)-F $C_3H_7$—⟨cyclohexane⟩—$C_2H_4$—⟨benzene(2,6-F,F)⟩—⟨benzene(3,4-F,F)⟩—F Example 2 3-HB(F)TB-2

$C_3H_7$—⟨cyclohexane⟩—⟨benzene(3-F)⟩—C≡C—⟨benzene⟩—$C_2H_5$

Example 3 1V2-BEB(F,F)-C $CH_3CH=CHCH_2CH_2$—⟨benzene⟩—COO—⟨benzene(2,6-F,F)⟩—CN

TABLE 2

| Example | 3 | 4 | 5 | 6 | 7 | 8 |
|---|---|---|---|---|---|---|
| transparent point (° C.) | 79.7 | 80.7 | 95.2 | 92.1 | 62.3 | 75.4 |
| viscosity (mP · s) | 31.1 | 26.9 | 28.1 | 27.6 | 22.6 | 24.9 |
| Δn | 0.159 | 0.122 | 0.165 | 0.140 | 0.157 | 0.119 |
| Δε | 7.9 | 8.6 | 8.0 | 5.5 | 6.8 | 7.9 |
| $K_{33}/K_{11}$ | 1.18 | 1.15 | 0.95 | 1.10 | 1.05 | 1.00 |
| Δnd (μm) | 0.95 | 1.00 | 0.8 | 1.00 | 0.89 | 0.90 |
| V.H.R. (%) | 99.0 | 99.1 | 97.1 | 96.8 | 97.0 | 97.3 |
| $V_{cr}$ (V) | 2.02 | 1.89 | 2.09 | 2.52 | 1.86 | 1.66 |

EFFECTS OF THE INVENTION

According to the invention, an electric optical system can be proposed which has a high contrast, a wide active temperature range, a high-speed response, a wide visual range, and a low temperature dependency of a threshold voltage.

BRIEF DESCRIPTION OF THE DRAWINGS

FIG. 1 illustrates a cell of an electric optical system according to the invention.

Figure 2:
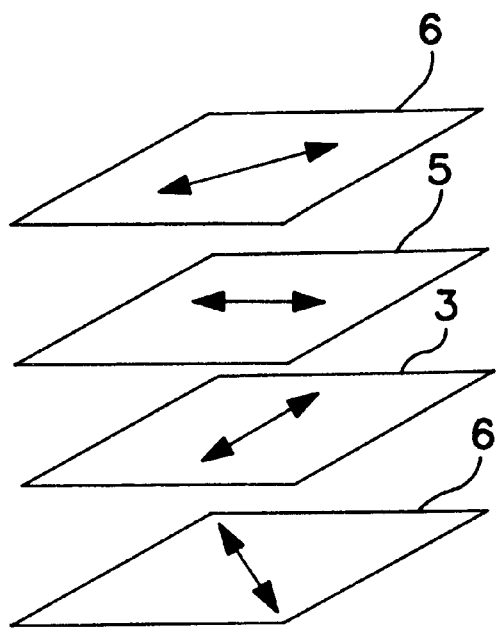
FIG. 2 shows optical directions of liquid crystal molecules, a birefringent membrane and a polarized plate in FIG. 1. In order to optimise a display contrast and a response time of the electric optical system according to the invention, some important requirements, namely 1) a chemical stability being high for long term,
2) an electric resistance being high,
3) a temperature dependency of a threshold voltage value being low etc. are requested for constituting materials, particularly liquid crystals and oriented membrane materials, arranged within insides of cells.

FIG. 2 shows optical axial directions of liquid crystal molecules, a birefringent membrane and a polarized plate.

DESCRIPTION OF THE REFERENCE NUMBERS

1: transparent electrode
2: oriented membrane
3: liquid crystals
4: pre-tilt angle
5: birefringent film
6: polarized plate

We claim:

1. In an electric optical system, wherein outsides of transparent upper and lower substrates in a bend cell are placed crossnicolly between at least one birefringent film and at least two polarized plates, and wherein the substrates facing each other have such a relationship that the pre-tilt direction of liquid crystal molecules layer in one substrate interface and pre-tilt direction of liquid crystal molecules layer in the other substrate interface of the substrates are symmetrical with respect to a plane parallel to the substrates, the improvement wherein the system contains at least one compound selected from the group consisting of liquid crystal compounds and liquid crystalline compounds expressed by the formula 1, and/or a liquid crystal mixture comprising at least one compound selected from the group consisting of liquid crystal compounds and liquid crystalline compounds expressed by the formulae 2, 3, 4A and 4B, and an oriented membrane made of compounds expressed by the formula 5,

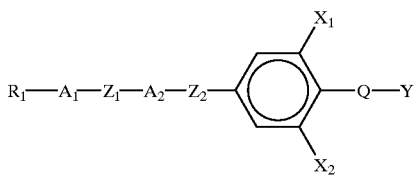
(1)

wherein, in formula 1, $R_1$ denotes an alkyl or alkoxy with 1 to 8 carbon atoms, an alkoxymethyl or alkoxyethyl group, or an alkenyl group with up to 7 carbon atoms, $Z_1$ and $Z_2$ denote independently from each other —$CH_2CH_2$—, —COO— or a single bond, Q is —$CF_2$—, —$OCF_2$—, $OCF_2CFHCF_2$— or a single bond, Y denotes H, F, Cl or an alkyl group optionally substituted with F atoms(s), $X_1$ and $X_2$ are H, Cl or F, and $A_1$ and $A_2$ are independently from each other trans-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene, pyrimidine-2,5-diyl or pyridine-2,5-diyl,

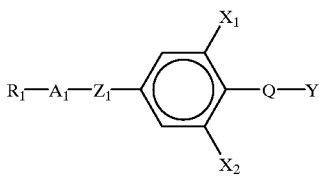
(2)

wherein, in formula 2, $R_1$ is alkyl, alkoxy or alkoxyalkyl with 1 to 8 carbon atoms, $Z_1$ denotes —$CH_2CH_2$—, —COO— or a single bond, Q is —$CF_2$—, —$OCF_2$— or a single bond, Y denotes H, F, Cl or an alkyl group optionally substituted with F atom(s), $X_1$ and $X_2$ are H, Cl or F, and $A_1$ is trans-1,4-cyclohexylene, 1,4 phenylene, 2-fluoro-1,4-phenylene, 3-fluoro-1,4-phenylene, 2,3-difluoro-1,4-phenylene, 3,5-difluoro-1,4-phenylene, pyrimidine-2,5-diyl or pyridine-2,5-diyl,

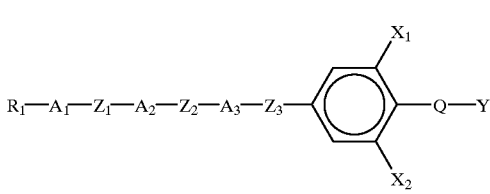
(3)

wherein, in formula 3, $R_1$ is an alkyl group with 1 to 8 carbon atoms, $Z_1$, $Z_2$ and $Z_3$ denote independently from each other —$CH_2CH_2$—, —COO— or a single bond, Q is —$CF_2$—, —$OCF_2$— or a single bond, Y denotes H, F, Cl or an alkyl group optionally substituted with F atom(s), $X_1$ and $X_2$ are H, Cl or F, and $A_1$, $A_2$ and $A_3$ are independently from each other trans-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene, pyrimidine-2,5-diyl or pyridine-2,5-diyl, $R_1$-L-E-$R_2$ (4A)

$R_1$-L-$CH_2CH_2$-E-$R_2$ (4B)

wherein, in formulae 4A and 4B, L and E denote independently from each other -Phe-, -Cyc-, -Phe-Phe-, -Phe-Cyc-, -Cyc-Cyc-, -Pyr-, -G-Phe-, -G-Cyc- and enantiomers, wherein -Phe- denotes 1,4-phenylene optionally substituted with F atom(s), -Cyc-denotes trans-1,4-cyclohexylene or trans-1,4-cyclohexenylene, -Pyr- denotes pyrimidine-2,5-diyl or pyridine-2,5-diyl, -G- denotes 2-(trans-1,4-cyclohexyl) ethyl, pyrimidine-2,5-diyl or pyridine-2,5-diyl, one of substituents L and E is -Phe-, -Cyc-, -Pyr- or -Phe-Cyc-, and $R_1$ and $R_2$ are independently from each other alkyl, alkenyl, alkoxy, alkenyloxy or alkanoyloxy with up to 8 carbon atoms,

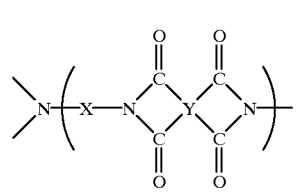
(5)

wherein X represents a group from formulae X1 to X8, and Y represents a group from formulae Y1 to Y8,

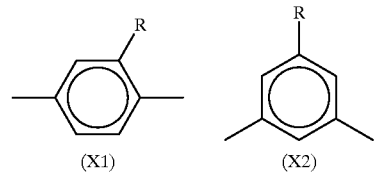

(X1)    (X2)

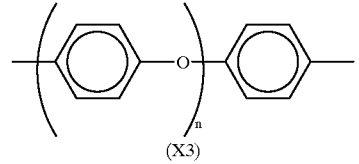

(X3)

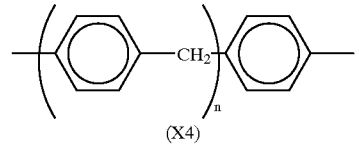

(X4)

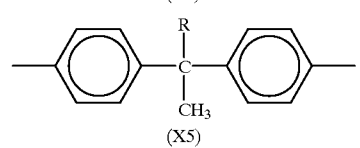

(X5)

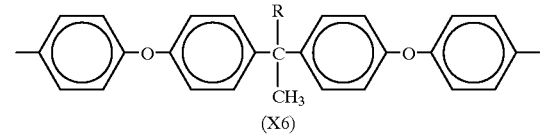

(X6)

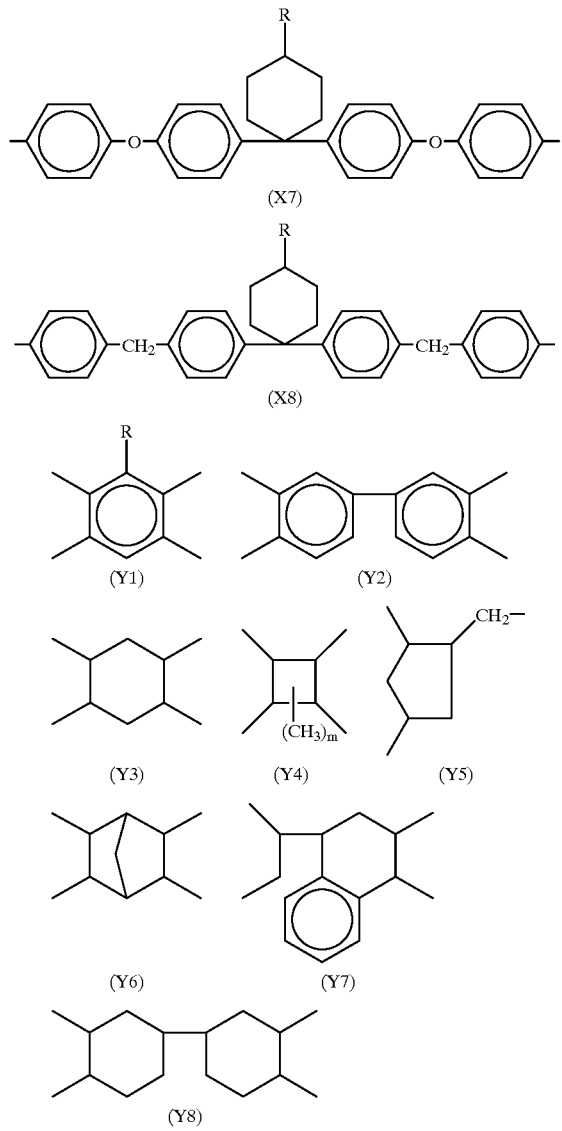

(X7)

(X8)

(Y1) (Y2) (Y3) (Y4) (Y5) (Y6) (Y7) (Y8)

wherein in formulae X1 to X8, R represents H or an alkyl group with 1 to 10 carbon atoms, and n represents a real number of 1 to 3, and in formulae Y1 to Y8, R represents H or an alkyl group with 1 to 10 carbon atoms, and m represents a real number of 1 to 4.

2. An electric optical system according to claim 1, wherein an active switch element is formed in matrix form on either of the facing transparent substrates.

3. An electric optical system according to claim 1, wherein a pre-tilt angle ranges at least within 0 to 20°, and the product of a refractive anisotropy and a thickness of the layer ranges within $0.3 \leq \Delta n \cdot d \leq 1.2$.

4. An electric optical system according to claim 1, wherein the formulae 1 to 3 are as follows:

formula 1

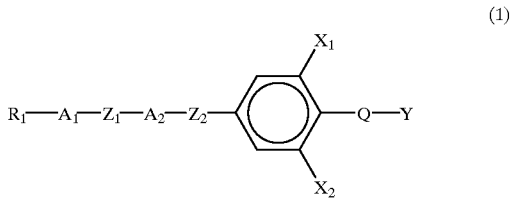

(wherein, $R_1$ is an alkyl group with 1 to 8 carbon atoms or an alkenyl group with up to 7 carbon atoms, $Z_1$ and $Z_2$ denote independently from each other —$CH_2CH_2$— or a single bond, Q is —$CF_2$—, —$OCF_2$—, —$OCF_2CFHCF_2$— or a single bond, Y denotes H, F, Cl or an alkyl group optionally substituted with F atom(s), $X_1$ and $X_2$ are H, Cl or F, $A_1$ and $A_2$ are independently from each other trans-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene, pyrimidine-2,5-diyl or pyridine-2,5-diyl, formula 2

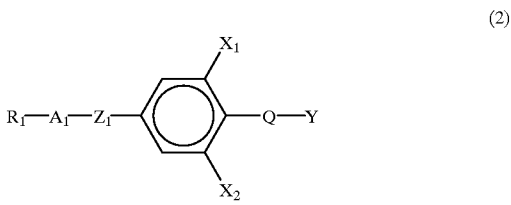

wherein $R_1$ is an alkyl with 1 to 8 carbon atoms, or an alkenyl with up to 7 carbon atoms, $Z_1$ denotes —$CH_2CH_2$— or a single bond, Q is —$CF_2$—, —$OCF_2$— or a single bond, Y denotes H, F, Cl or an alkyl group optionally substituted with F atom(s), $X_1$ and $X_2$ are H, Cl or F, $A_1$ is trans-1,4-cyclohexylene, 1,4-phenylene, 2-fluoro-1, 4-phenylene, 3-fluoro-1,4-phenylene, 2,3-difluoro-1,4-phenylene, 3,5-difluoro-1,4-phenylene, pyrimidine-2, 5-diyl or pyridine-2,5-diyl, formula 3

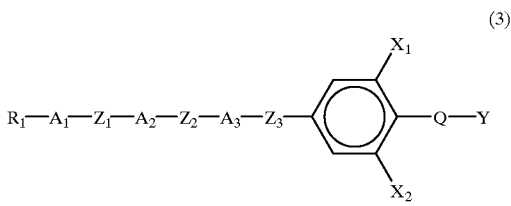

wherein $R_1$ is an alkyl group with 1 to 8 carbon atoms, $Z_1$, $Z_2$ and $Z_3$ denote independently from each other —CH2CH2— or a single bond, Q is —$CF_2$—, —$OCF_2$— or a single bond, Y denotes H, F, Cl or an alkyl group optionally substituted with F atom(s), $X_1$ and $X_2$ are H, Cl or F, $A_1$, $A_2$ and $A_3$ are independently from each other trans-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene, pyrimidine-2,5-diyl or pyridine-2,5-diyl.

5. An electric optical system according to claim 1, wherein at least one of the compounds selected from the formula 1 is expressed as follows:

formula 1

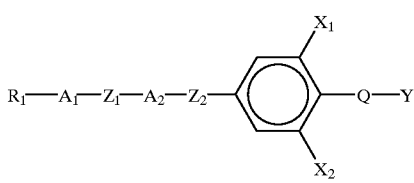

(1)

wherein $R_1$ is an alkyl group with 1 to 8 carbon atoms, $Z_1$ and $Z_2$ denote independently from each other —$CH_2CH_2$— or a single bond, Q is —$CF_2$—, —$OCF_2$—, —$OCF_2CFHCF_2$— or a single bond, Y denotes H, F, Cl or an alkyl group optionally substituted with F atom(s), $X_1$ and $X_2$ are H, Cl or F, $A_1$ and $A_2$ are independently from each other trans-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene, pyrimidine-2,5-diyl or pyridine-2,5-diyl, with the proviso that either of A1 and A2 is pyrimidine-2,5-diyl or pyridine-2,5-diyl.

6. An electric optical system according to claim 1, wherein at least one of the compounds selected from the formula 2 is expressed as follows:

formula 2

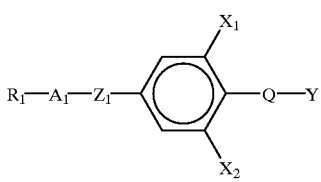

(2)

wherein R1 is an alkyl with 1 to 8 carbon atoms, or an alkenyl with up to 7 carbon atoms, $Z_1$ denotes —$CH_2CH_2$— or a single bond, Q is —$CF_2$—, —$OCF_2$— or a single bond, Y denotes H, F, Cl or an alkyl group optionally substituted with F atom(s), $X_1$ and $X_2$ are H, Cl or F, A1 is pyrimidine-2,5-diyl or pyridine-2,5-diyl.

7. An electric optical system according to claim 1, wherein at least one of the compounds selected from the formula 3 is expressed as follows:

formula 3

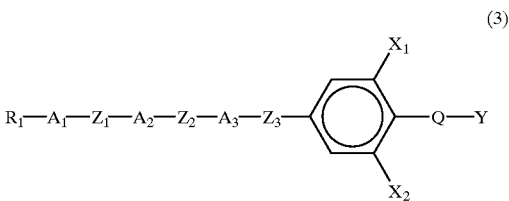

(3)

wherein R1 is an alkyl group with 1 to 8 carbon atoms, $Z_1$, $Z_2$ and $Z_3$ denote independently from each other —$CH,CH_2$— or a single bond, Q is —$CF_2$—, —$OCF_2$— or a single bond, Y denotes H, F, Cl or an alkyl group optionally substituted with F atom(s), $X_1$ and $X_1$ are H, Cl or F, $A_1$, $A_2$ and $A_3$ are independently from each other trans-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene, pyrimidine-2,5-diyl or pyridine-2,5-diyl, with the proviso that one of $A_1$, $A_2$ and $A_3$ is pyrimidine-2,5-diyl or pyridine-2,5-diyl.

8. An electric optical system according to claim 1, wherein at least one of the compounds selected from the formula 1 is expressed as follows:

formulae (1-15) to (1-22)

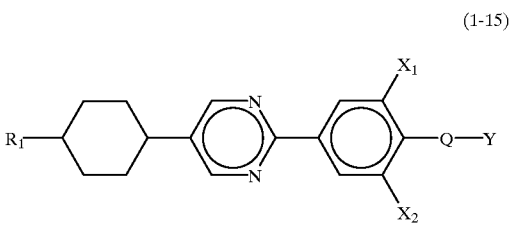

(1-15)

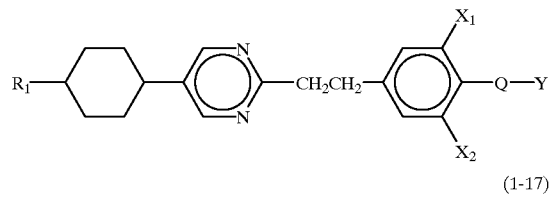

(1-16)

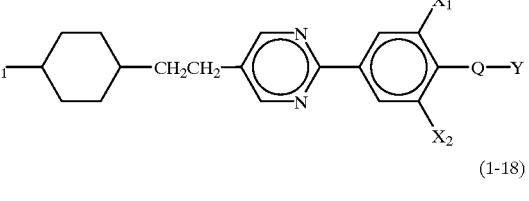

(1-17)

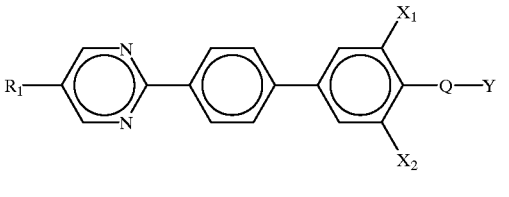

(1-18)

63

-continued (1-19)

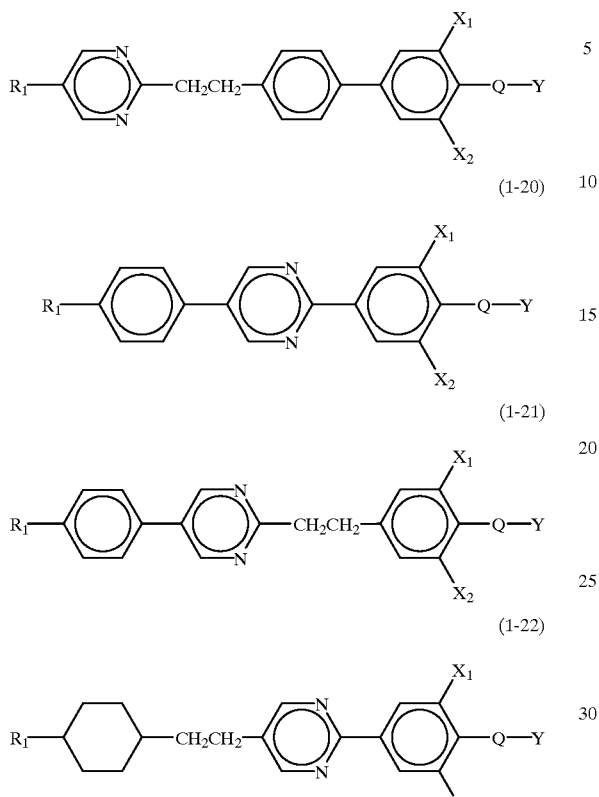

(1-20)

(1-21)

(1-22)

wherein $R_1$ is an alkyl group with 1 to 8 carbon atoms,

Q is —$CF_2$—, —$OCF_2$— or a single bond,

Y denotes H, F, Cl or an alkyl group optionally substituted with F atom(s), $X_1$ and $X_1$ are H, Cl or F, and 1,4-phenylene may be substituted with one or more than one F atom(s) and may be 2-fluoro-1,4-phenylene, 3-fluoro-1,4-phenylene, 2,3-difluoro-1,4-phenylene or 3,5-difluoro-1,4-phenylene.

9. An electric optical system according to claim 1, wherein at least one of the compounds selected from the formula 2 is expressed as follows:

formulae (2-7) to (2-12)

(2-7)

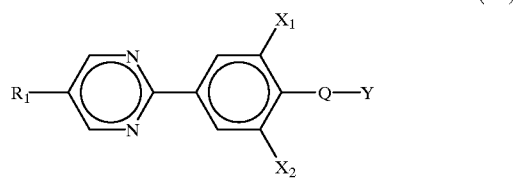

64

-continued (2-8)

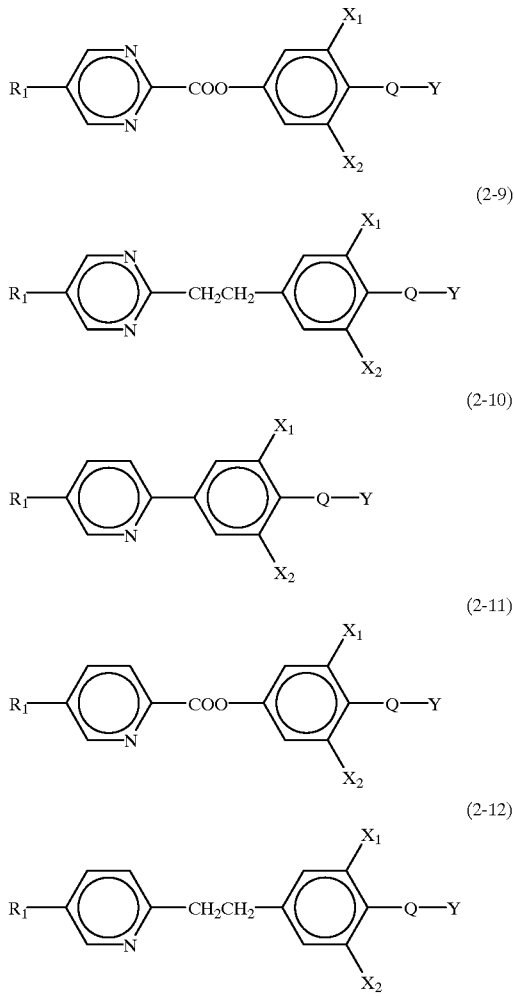

(2-9)

(2-10)

(2-11)

(2-12)

wherein $R_1$ is an alkyl with 1 to 8 carbon atoms,

Q is —$CF_2$—, —$OCF_2$— or a single bond,

Y denotes H, F, Cl or an alkyl group optionally substituted with F atom(s),

X1 and X2 are H, Cl or F, and 1,4-phenylene may be substituted with one or more than one F atom(s) and may be 2-fluoro-1,4-phenylene, 3-fluoro-1,4-phenylene, 2,3-difluoro-1,4-phenylene or 3,5-difluoro-1,4-phenylene.

10. An electric optical system according to claim 1, wherein at least one of the compounds selected from the formula 3 is expressed as follows:

formulae (3-1) to (3-4)

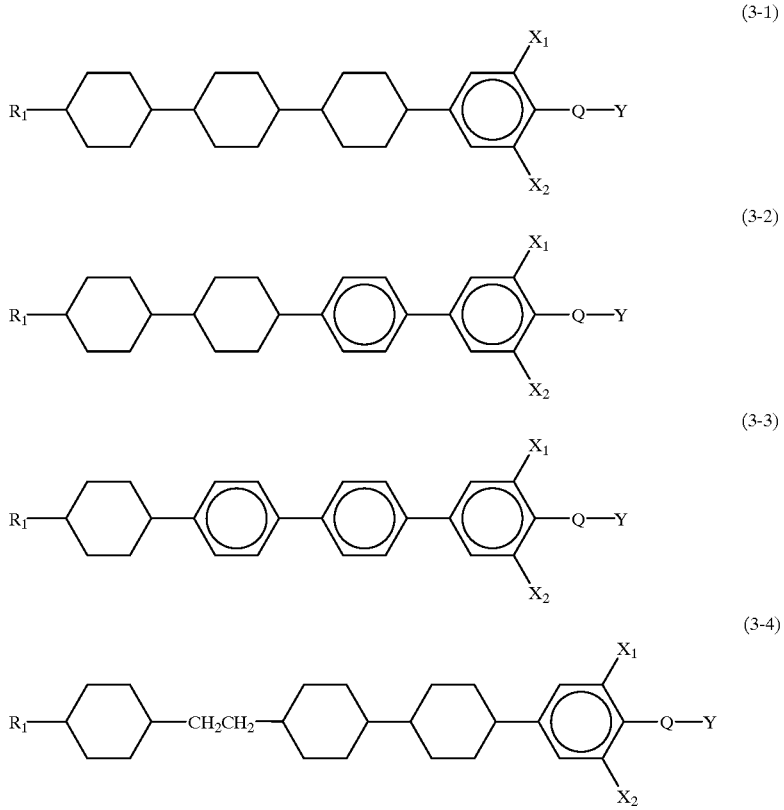

wherein $R_1$ is an alkyl group with 1 to 8 carbon atoms,

Q is —$CF_2$—, —$OCF_2$— or a single bond,

Y denotes H, F, Cl or an alkyl group optionally substituted with F atom(s), $X_1$ and $X_2$ are H, Cl or F, and 1,4-phenylene may be substituted with one or more than one F atom(s) and may be 2-fluoro-1,4-phenylene, 3-fluoro-1,4-phenylene, 2,3-difluoro-1,4-phenylene or 3,5-difluoro-1,4-phenylene.

11. An electrical optical system according to claim 1, wherein the liquid crystal mixture contains more than 60% of at least one compound selected from the group consisting of liquid crystal compounds and liquid crystalline compounds of the formula 1 and/or formulae 2, 3, 4A and 4B, and the liquid crystal mixture has a refractive anisotropy of $0.05 \leq \Delta n \leq 0.25$, an elastic modulus ratio of $K_{33}/K_{11} \leq 1.5$, and a dielectric anisotropy of $\Delta \epsilon \geq 1$.

12. An electric optical system according to claim 11, wherein the liquid crystal mixture contains more than 80% of at least one compound selected from the group consisting of liquid crystal compounds and liquid crystalline compounds of the formula 1 and/or formula 2, 3, 4A and 4B.

13. An electric optical system according to claim 11, wherein the liquid crystal mixture contains 100% of at least one compound selected from the group consisting of liquid crystal compounds and liquid crystalline compounds of the formula 1 and/or formulae 2, 3, 4A and 4B.

14. An electric optical system according to claim 11, wherein the liquid crystal mixture has a dielectric anisotropy of $\Delta \epsilon \geq 3$.

15. An electric optical system according to claim 1, wherein the liquid crystal mixture has a refractive anisotropy of $0.06 \leq \Delta n \leq 0.20$, and an elastic modulus ratio of $K_{33}/K_{11} \leq 1.2$.

16. An electric optical system according to claim 1, wherein X in the formula 5 is selected from the formulae X1, X2, X4 and X8, and Y in the formula 5 is selected from the formulae Y1, Y2, Y4, Y6 and Y7.

17. An electric optical system according to claim 16, wherein the oriented membrane is made of a compound of formula 5 obtained by copolymerizing 60 to 90% of at least one compound expressed by the formulae 6A1, 6A2 and 6A3 with 0 to 40% of at least one compound expressed by the formulae 6B1 and 6B2 and 0 to 20% of at least one diamine having a side chain(s) of the formulae 6C1 and 6C2,

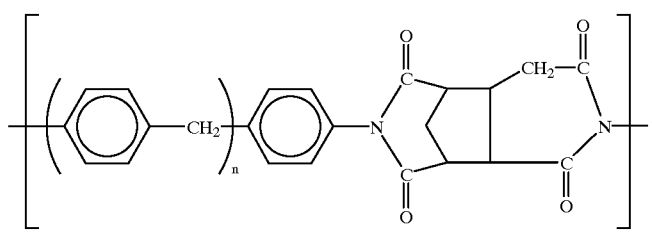
(6A1)
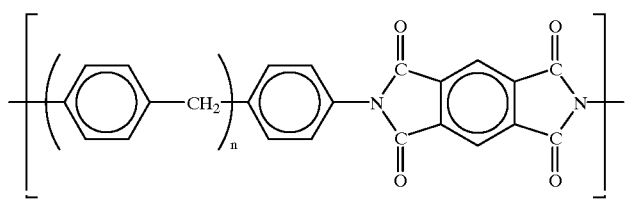
(6A2)
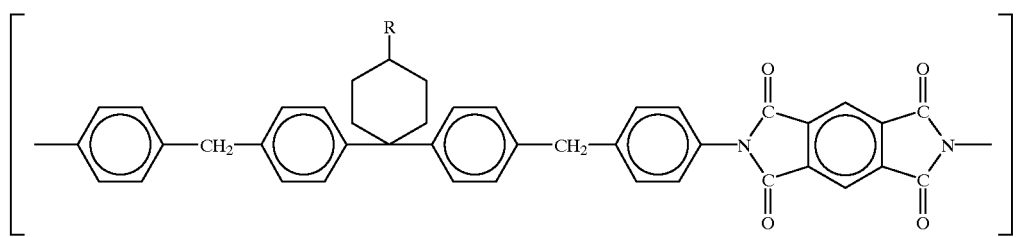
(6A3)
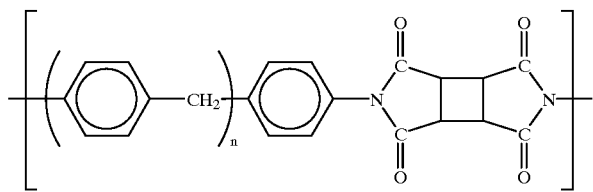
(6B1)
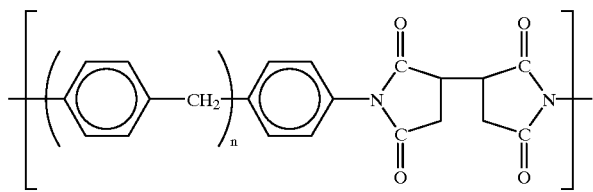
(6B2)
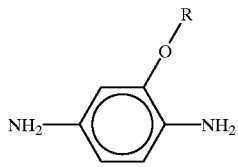
(6C1)
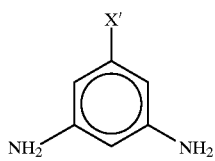
(6C2)
wherein, in the formulae 6A1 to 6A3, R represents H or an alkyl group with 1 to 10 carbon atoms, and n represents a real number of 1 to 3, in the formulae 6B1 to 6B2, n represents a real number of 1 to 3, and in the formulae 6C1 to 6C2, X' represents R—O— or R—, and R represents an alkyl group with 5 to 20 carbon atoms.
* * * * *